(12) United States Patent
Brehove et al.

(10) Patent No.: US 11,157,635 B2
(45) Date of Patent: Oct. 26, 2021

(54) SECURE INTERFACE DISABLEMENT

(71) Applicant: QUALCOMM Incorporated, San Diego, CA (US)

(72) Inventors: James Brehove, Vista, CA (US); Vijayalakshmi Raveendran, Del Mar, CA (US); Olav Haugan, San Diego, CA (US); Britton Kendall Bigelow, San Diego, CA (US); Kavita Paryani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 377 days.

(21) Appl. No.: 16/118,245

(22) Filed: Aug. 30, 2018

(65) Prior Publication Data
US 2019/0311141 A1    Oct. 10, 2019

Related U.S. Application Data

(60) Provisional application No. 62/654,473, filed on Apr. 8, 2018.

(51) Int. Cl.
*G06F 21/60* (2013.01)
*G06F 9/455* (2018.01)
*G06F 13/10* (2006.01)

(52) U.S. Cl.
CPC ........ *G06F 21/604* (2013.01); *G06F 9/45558* (2013.01); *G06F 13/102* (2013.01); *G06F 2009/45579* (2013.01); *G06F 2009/45583* (2013.01)

(58) Field of Classification Search
CPC ............ G06F 12/1027; G06F 12/1036; G06F 21/604; G06F 9/45558; G06F 13/102; G06F 2009/45579; G06F 2009/45583; H04W 48/04; H04W 12/63; H04W 12/64; H04L 67/18
See application file for complete search history.

(56) References Cited

U.S. PATENT DOCUMENTS

| 6,992,991 B2* | 1/2006 | Duske, Jr. .......... H04B 7/18567 370/316 |
| --- | --- | --- |
| 7,263,623 B1* | 8/2007 | Crosland ............... G06F 1/3287 713/324 |
| 8,924,708 B2† | 12/2014 | Yoffe |

(Continued)

FOREIGN PATENT DOCUMENTS

WO    2017105577 A1    6/2017

OTHER PUBLICATIONS

International Search Report and Written Opinion—PCT/US2019/015121—ISA/EPO—dated Apr. 30, 2019, 13 pages.

*Primary Examiner* — Richard A McCoy
(74) *Attorney, Agent, or Firm* — The Marbury Law Group, PLLC

(57) ABSTRACT

Various embodiments include methods and devices for implementing secure peripheral interface disablement on a computing device. Various embodiments may include receiving a trigger to disable a peripheral interface associated with a peripheral device of the computing device, identifying a physical address of the peripheral interface, and securely removing a mapping of an intermediate physical address of the peripheral interface to the physical address of the peripheral interface.

30 Claims, 15 Drawing Sheets

(56) References Cited

U.S. PATENT DOCUMENTS

| | | | |
|---|---|---|---|
| 9,063,891 B2 | 6/2015 | Kegel | |
| 9,092,969 B2* | 7/2015 | McCown | H04M 11/04 |
| 9,665,340 B2* | 5/2017 | Kuniansky | G06F 21/10 |
| 2007/0168636 A1 | 7/2007 | Hummel et al. | |
| 2010/0017893 A1 | 1/2010 | Foley et al. | |
| 2011/0022818 A1 | 1/2011 | Kegel et al. | |
| 2012/0173843 A1* | 7/2012 | Kamdar | G06F 12/1027 |
| | | | 711/207 |
| 2013/0080726 A1 | 3/2013 | Kegel et al. | |
| 2013/0204962 A1 | 8/2013 | Estevez et al. | |
| 2014/0282501 A1 | 9/2014 | Zeng et al. | |
| 2015/0095610 A1* | 4/2015 | Ben-Meir | G06F 12/1036 |
| | | | 711/207 |
| 2015/0293776 A1* | 10/2015 | Persson | G06F 9/5016 |
| | | | 718/1 |
| 2016/0308540 A1* | 10/2016 | Subramanian | H03L 7/0812 |
| 2017/0046187 A1 | 2/2017 | Tsirkin | |
| 2017/0177909 A1 | 6/2017 | Sarangdhar et al. | |
| 2017/0244715 A1* | 8/2017 | Menon | H04W 12/0609 |
| 2018/0088958 A1* | 3/2018 | Remis | G06F 9/4411 |

\* cited by examiner
† cited by third party

SECURE INTERFACE DISABLEMENT

RELATED APPLICATIONS

This application claims the benefit of priority to U.S. Provisional Patent Application Ser. No. 62/654,473 entitled "Secure Interface Disablement" filed on Apr. 8, 2018, the entire contents of which are hereby incorporated herein by reference for all purposes.

BACKGROUND

The malicious use of a mobile device peripherals, like cameras and microphones, can result in the loss of sensitive data from government or commercial facilities. Consequently, some secure government and commercial facilities do not allow users to bring their mobile devices inside. Other facilities require the installation of Mobile Device Management (MDM) software so that the enterprise can control and monitor the operation of the device.

SUMMARY

Various embodiments may include apparatuses and methods for secure peripheral interface disablement on a computing device. Various embodiments may include receiving a trigger to disable a peripheral interface associated with a peripheral device of the computing device, identifying a physical address of the peripheral interface, and removing a mapping of an intermediate physical address of the peripheral interface to the physical address of the peripheral interface.

Some embodiments may further include receiving a request to unmap the intermediate physical address of the peripheral interface and the physical address of the peripheral interface in a stage 2 memory translation table. In some embodiments, removing a mapping of an intermediate physical address of the peripheral interface to the physical address of the peripheral interface may include removing the mapping of the intermediate physical address of the peripheral interface to the physical address of the peripheral interface from the stage 2 memory translation table in response to the request.

Some embodiments may further include receiving a request to access the peripheral interface, checking a stage 2 memory translation table for the mapping of the intermediate physical address of the peripheral interface to the physical address of the peripheral interface, determining that the mapping of the intermediate physical address of the peripheral interface to the physical address of the peripheral interface is not found in the stage 2 memory translation table, and issuing a memory exception in response to determining that the mapping of the intermediate physical address of the peripheral interface to the physical address of the peripheral interface is not found in the stage 2 memory translation table.

Some embodiments may further include receiving a trigger to enable the peripheral interface associated with the peripheral device of the computing device, receiving a request to map the intermediate physical address of the peripheral interface and the physical address of the peripheral interface in the stage 2 memory translation table, and adding the mapping of the intermediate physical address of the peripheral interface to the physical address of the peripheral interface in the stage 2 memory translation table in response to the request.

Some embodiments may further include determining whether a state of the peripheral interface is locked. In some embodiments, adding the mapping of the intermediate physical address of the peripheral interface to the physical address of the peripheral interface in the stage 2 memory translation table may include adding the mapping of the intermediate physical address of the peripheral interface to the physical address of the peripheral interface in the stage 2 memory translation table in response to determining that the state of the peripheral interface is locked. Some embodiments may further include setting a state of the peripheral interface to unlocked in response to determining that the state of the peripheral interface is locked.

Some embodiments may further include signaling to a high level operating system executing on a first virtual machine to shut down and unload a peripheral device driver of the peripheral device, and executing a limited high level operating system on a second virtual machine excluding the peripheral device driver of the peripheral device.

Some embodiments may further include receiving, from a trusted execution environment that may be different from an execution environment in which a high level operating system is executing, a request to unmap or to map the intermediate physical address of the peripheral interface to the physical address of the peripheral interface in a stage 2 memory translation table.

Some embodiments may further include accessing a peripheral device driver of the peripheral device executing in a trusted execution environment by a high level operating system executing in an execution environment via routing an access request to the peripheral device driver through the trusted execution environment.

Some embodiments may further include accessing a peripheral device driver of the peripheral device executing in a first virtual machine by a high level operating system executing on a second virtual machine via routing an access request to the peripheral device driver through the first virtual machine.

Various embodiments include computing devices having a memory, a peripheral interface, and a processor configured to perform operations of any of the methods summarized above. Various embodiments include computing devices having means for performing functions of any of the methods summarized above. Various embodiments include a non-transitory processor readable storage medium on which are stored processor-executable instructions configured to cause a processor to perform operations of any of the methods summarized above.

BRIEF DESCRIPTION OF THE DRAWINGS

The accompanying drawings, which are incorporated herein and constitute part of this specification, illustrate example aspects of various embodiments, and together with the general description given above and the detailed description given below, serve to explain the features of the claims.

DETAILED DESCRIPTION

Figure 1:
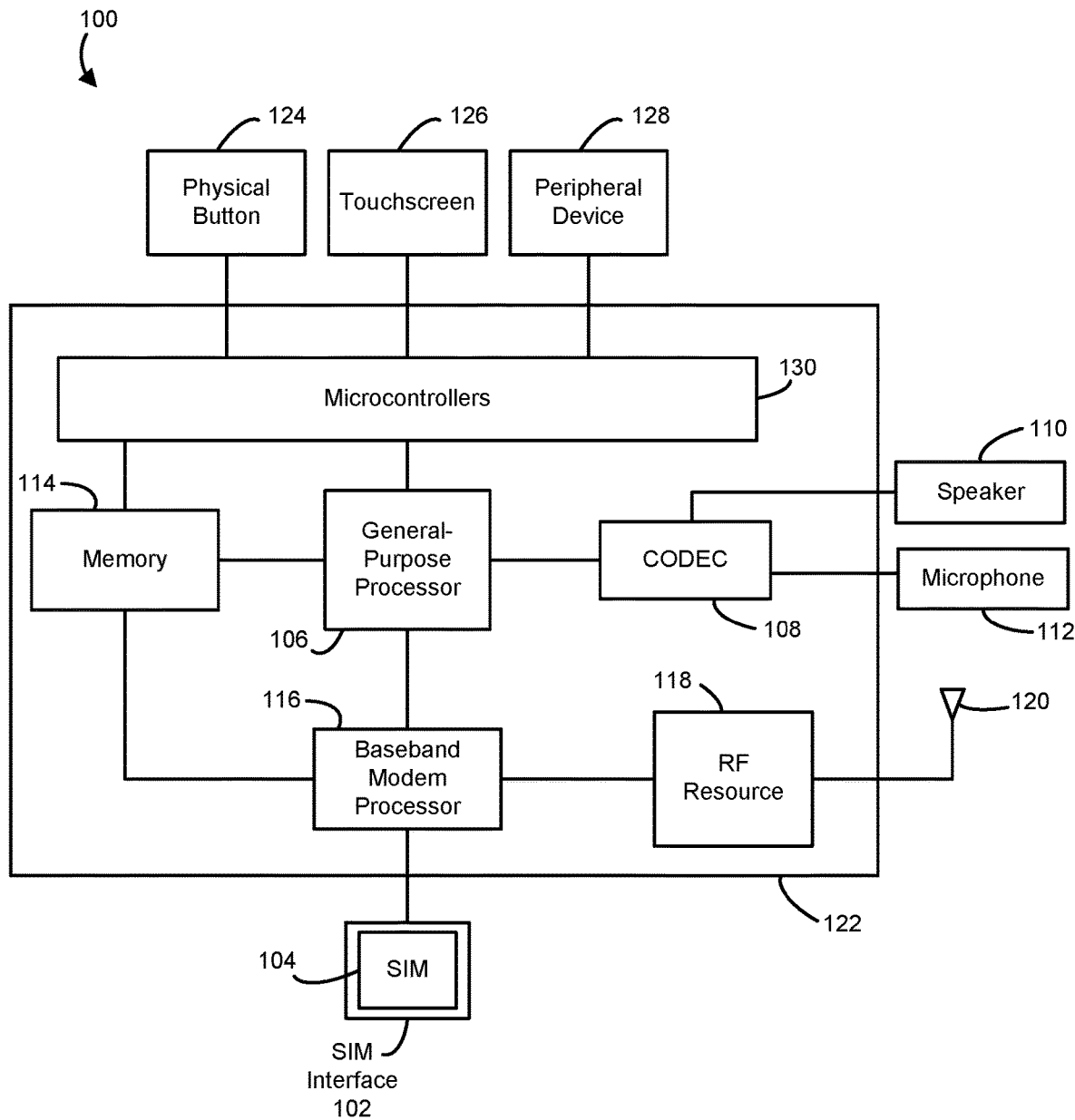
FIG. 1 is a component block diagram illustrating an example computing device suitable for implementing various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments may include methods, and computing devices implementing such methods for secure disablement and re-enablement of peripheral interfaces on computing devices to disable/enable access to various peripheral devices. Various embodiments may include such methods, and computing devices implementing such methods to disable peripheral interfaces that cannot be thwarted by software or a user. Disablement of peripheral interfaces is useful for protecting personal privacy, as well as sensitive government and commercial facilities. Disablement of peripheral interfaces is useful for safety purposes, such as reducing distracted driving in a vehicle and interference with medical devices in a medical treatment facility. Disablement of peripheral interfaces is useful for preventing disturbances during a presentation, a performance, or showing of movie. Disablement of peripheral interfaces is useful for preventing users from using peripheral devices of a computing device. Disablement of peripheral interfaces is useful for preventing malicious software use of peripheral devices of a computing device. For example, disablement of peripheral interfaces is useful for preventing malicious software use of peripheral devices without user permission. Disablement of peripheral interfaces is useful for preventing malicious software use of peripheral devices by defeating Mobile Device Management (MDM) software. Disablement of peripheral interfaces is useful for remote monitoring of enhanced machine-type communication (eMTC) devices and Internet of Things (IoT) devices for operations administration maintenance (OAM) scenarios.

Disablement of peripheral interfaces may be implemented selectively as to the peripheral interfaces that are disabled and may allow for use of enabled peripheral interfaces while disabled peripheral interfaces are not usable. For example, a peripheral interface for a radio transmitter may remain enabled while a peripheral interface for a camera light sensor may be disabled. In such an example, a user of a computing device may be able to use communication functions of the computing device while being prevented from using visual image capture functions of the computing device. As such, disablement of peripheral interfaces may be configured to both provide the benefits of disablement of peripheral interfaces while still providing a user of a computing device the convenience of use of certain functions of the computing device.

Various embodiment methods for disabling peripheral interfaces described herein provide technical advantages over existing MDM policies and software. Disablement of peripheral interfaces according to various embodiments cannot be defeated by malicious software on a computing device. Disablement of peripheral interfaces cannot be defeated by a user of a computing device. Disablement of peripheral interfaces according to various embodiments may allow a user to maintain possession of a computing device. Disablement of peripheral interfaces according to various embodiments may allow a user to use functions of a computing device for enabled peripheral interfaces while preventing the user from using functions of the computing device for disabled peripheral interfaces. Disablement of peripheral interfaces according to various embodiments may not rely on a user of a computing device to comply with disablement of peripheral interfaces.

Various embodiments may be used in a variety of computing devices, but may be particularly useful in wireless communication devices that are mobile and thus may be introduced into situations where disabling peripheral devices is desired. The term "computing device" is used herein to refer to any of a variety of computing devices including smartphones, mobile computing devices (e.g., tablets, laptops, wearable devices, etc.), cellular-based wireless hotspots, IoT devices, eMTC devices, desktops, workstations, serves, embedded systems of electromechanical systems (e.g., vehicles, industrial and agricultural machinery, medical devices, control systems, etc.), and the like. Wireless communication devices are also commonly referred to as user equipment (UE), mobile devices, and cellular devices. Computing devices may receive and/or transmit communications via a variety of wired and/or wireless communication networks, including wide area networks (e.g., mobile communication networks), local area networks (e.g., Wi-Fi, Bluetooth, etc.), geolocation networks (e.g., Global Positioning System ("GPS")), personal area networks (e.g., Wireless USB, Bluetooth, ZigBee, etc.), near-field communication, etc.

The term "peripheral device" is used herein to refer to any of a variety of sensors, actuators, and/or communication components of a computing device. Nonlimiting examples of peripheral devices include an audio frequency receiver and/or emitter, a radio frequency receiver and/or transmitter, a light frequency receiver and/or emitter, an electromagnetic field receiver and/or emitter, an electrical sensor, a motion sensor, an orientation sensor, a vibration sensor, a temperature sensor, a pressure sensor, and the like. A peripheral device may be integral to and/or attachable to or detachable from the computing device.

The term "peripheral interface" is used herein to refer to any of a variety of resources used by the computing device to interact with and control a peripheral device, including peripheral device drivers, peripheral device memory, peripheral device controllers/microcontrollers, peripheral device memory registers, memory registers for controlling peripheral devices, and the like. A peripheral interface may be associated with any one or combination of functions of a peripheral device. For the sake of simplicity and ease of explanation, embodiments herein are described in terms of disabling and enabling peripheral devices and peripheral interfaces. In various embodiments, disabling and enabling peripheral devices and peripheral interfaces may relate to disabling and enabling any one or combination of functions of a peripheral device. In other words, a peripheral device may be completely or partially disabled and enabled. Further, disabling and enabling a peripheral device may be accomplished solely by disabling access to the associated peripheral interface without a material change to either the peripheral device or the peripheral interface.

The terms "input" and "trigger" are used interchangeably herein to refer to an of a variety of signals configured to cause the computing device to disable and/or enable a peripheral interface. In various embodiments a trigger may include any input by any means to the computing device, such as a location based on GPS, cellular, and/or Wi-Fi data; a Bluetooth beacon; a near-field communication signal, such as swipe or tap of a fob or key card; a visual code scan, such as a barcode or a quick response (QR) code; a user input by a trusted user, such as a physical button or touchscreen interaction; a proximity to a device indicated via Wi-Fi Direct, near-field communication, Bluetooth, and/or C-V2X; multifactor authentication; iris detection while using a virtual reality display; a signal from a remotely connected computing device; etc. In various embodiments, a trigger may include a lack of a continuous or repetitive input.

FIG. 1 illustrates components of a computing device 100 that is suitable for implementing the various embodiments. The various embodiments described herein may be implemented in a computing device 100 that operates within a variety of communication systems, such as any number of mobile networks, such as mobile telephony networks. In various embodiments, a computing device 100 may support any number of subscriptions to mobile telephony networks. To support subscriptions to multiple mobile telephony networks, in some embodiments the computing device 100 may be a multi-SIM communication device.

A computing device 100 may communicate with a mobile telephony network via a cellular connection to a base station of the mobile telephony network. The cellular connection may be made through two-way wireless communication links using a variety of communication technologies, such as Long Term Evolution (LTE), fifth generation (5G), fourth generation (4G), third generation (3G), Code Division Multiple Access (CDMA), Time Division Synchronous Code Division Multiple Access (TD-SCDMA), Wideband Code Division Multiple Access (WCDMA), Global System for Mobile communication (GSM), and other mobile telephony communication technologies. Other connections may include various other wireless connections, including WLANs, such as Wi-Fi based on Institute of Electrical and Electronics Engineers (IEEE) 802.11 standards, and wireless location services, such as the Global Positioning System (GPS); WPANs, such as Wireless USB, Bluetooth, and ZigBee; and/or near-field communication.

A computing device 100 may include any number of subscriber identity modules (SIM) interfaces which may receive an identity module. The computing device 100 may include a subscriber identity module (SIM) interface 102, which may receive an identity module SIM 104 that is associated with a subscription to a mobile telephony network. In various embodiments, the computing device 100 may be a multi-subscription computing device including a second (or more) SIM interface (not shown), which may receive a second identity module SIM (not shown) that is associated with a second subscription to a second mobile telephony network.

A SIM 104 in the various embodiments may be a Universal Integrated Circuit Card (UICC) that is configured with SIM and/or Universal SIM (USIM) applications, enabling access to, for example, GSM, and/or Universal Mobile Telecommunications System (UMTS) networks. The UICC may also provide storage for a phone book and other applications. Alternatively, in a CDMA network, a SIM may be a UICC removable user identity module (R-UIM) or a CDMA subscriber identity module (CSIM) on a card.

Each SIM 104 may have a central processor unit (CPU), read only memory (ROM), random access memory (RAM), electrically erasable programmable read only memory (EEPROM), and input/output (I/O) circuits. A SIM used in the various embodiments may contain user account information, an international mobile subscriber identity (IMSI), a set of SIM method application toolkit (SAT) commands, and storage space for phone book contacts. A SIM may further store a mobile country code (MCC), mobile network code (MNC), and a Home Public-Land-Mobile-Network (HPLMN) code to indicate the SIM card network operator provider. An Integrated Circuit Card Identity (ICCID) SIM serial number may be printed on the SIM for identification.

Each computing device 100 may include at least one controller, such as a general purpose processor 106 (e.g., a central processing unit ("CPU")), which may be coupled to a coder/decoder (CODEC) 108. The CODEC 108 may be coupled to a speaker 110 and a microphone 112. The general purpose processor 106 may also be coupled to at least one memory 114. The memory 114 may be a non-transitory tangible computer readable storage medium that stores processor-executable instructions. For example, the instructions may include routing communication data relating to a subscription through a corresponding baseband-radio frequency (RF) resource chain, or RF chain.

The memory 114 may store operating system (OS) software, as well as user application software and executable instructions, including instructions configured to cause a processor to perform operations of various embodiments. The memory 114 may also store application data, such as an array data structure.

The general purpose processor 106 and memory 114 may each be coupled to at least one baseband modem processor 116. In various embodiments the SIM 104 in the computing device 100 may be associated with a baseband-RF resource chain. In various embodiments, multiple SIMs 104 may be associated with a common baseband-RF resource chain shared by two or more SIMs 104, or a SIM 104 may be associated with a dedicated baseband-RF resource chain. Each baseband-RF resource chain may include the baseband modem processor 116 to perform baseband/modem functions for communications on a SIM 104, and one or more amplifiers and radios, referred to generally herein as RF resource 118. In some embodiments, baseband-RF resource chains may interact with a shared baseband modem processor 116 (i.e., a single device that performs baseband/modem functions for all SIMs 104 on the computing device). Alternatively, each baseband-RF resource chain may include physically or logically separate baseband processors.

In some embodiments, the baseband modem processor 116 may be an integrated chip capable of managing the protocol stacks of the SIMs 104 or subscriptions and implementing a co-existence manager software. By implementing modem software, subscription protocol stacks, and the co-existence manager software on this integrated baseband modem processor 116, thread based instructions may be used on the integrated baseband modem processor 116 to communicate instructions between the software implementing interference mitigation techniques for co-existence issues, and the receive (Rx) and transmit (Tx) operations.

The RF resource 118 may be communication circuits or transceivers that perform transmit/receive functions for the associated SIM 104 of the computing device 100. The RF resource 118 may be communication circuits that include separate transmit and receive circuitry, or may include a transceiver that combines transmitter and receiver functions. The RF resource 118 may be configured to support multiple radio access technologies/wireless networks that operate according to different wireless communication protocols. The RF resource 118 may include or provide connections to different sets of amplifiers, digital to analog converters, analog to digital converters, filters, voltage controlled oscillators, etc. Multiple antennas 120 and/or receive blocks may be coupled to the RF resource 118 to facilitate multimode communication with various combinations of antenna and receiver/transmitter frequencies and protocols (e.g., LTE, Wi-Fi, Bluetooth, near-field communication, and/or the like). The RF resources 118 may also be coupled to the baseband modem processor 116.

In some embodiments, the general purpose processor 106, memory 114, baseband processor(s) 116, and RF resource 118 may be included in the computing device 100 as a system-on-chip (SoC) 122. In other embodiments, the SIM 104 and its corresponding interfaces 102 may be external to the system-on-chip 122. Further, various peripheral devices, that may function as input and output devices, may be coupled to components on the system-on-chip 122, such as interfaces or controllers/microcontrollers 106, 108, 116, 118, 130. Example user peripheral device suitable for use in the computing device 100 may include, but are not limited to, the speaker 110, the microphone 112, the antenna 120, a physical button 124, a touchscreen display 126, and other peripheral devices 128 as described herein, such as a camera.

In some embodiments, the computing device 100 may be a single-technology or multiple-technology device having more or less than two RF chains. Further, various embodiments may be implemented in single RF chain or multiple RF chain computing devices with fewer SIM cards than the number of RF chains, including devices that do not use any physical SIM cards relying instead on virtual SIM applications. In various embodiments, the computing device 100 having a common baseband-RF resource chain may be capable of operating in a single radio LTE mode to allow multiple radio access technologies to share the common baseband-RF resource chain.

Figure 2:
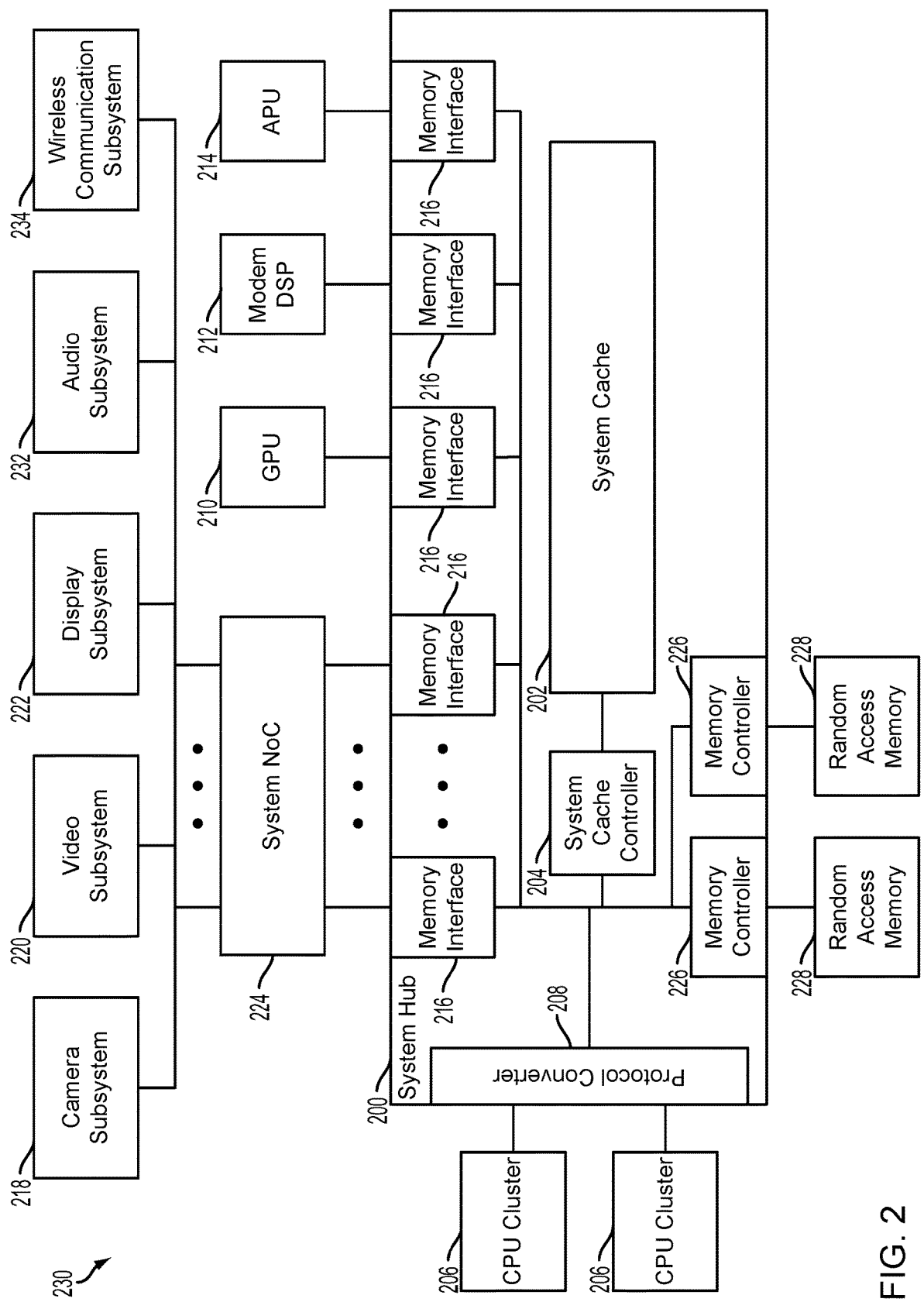
FIG. 2 is a component block diagram illustrating an example computing device suitable for implementing various embodiments.

FIG. 2 illustrates a computing device (e.g., computing device 100 in FIG. 1) with multiple peripheral device components suitable for implementing an embodiment. With reference to FIGS. 1 and 2, an SoC 230 (e.g., SoC 122 in FIG. 1) may include a variety of components as described above. Some such components and additional components may be subsystems of the computing device 100. The SoC 230 may include various communication components configured to communicatively connect the components of the SoC 230 that may transmit, receive, and share data. The communication components may include a system hub 200, a protocol converter 208, and a system network on chip (NoC) 224. The communication components may facilitate communication between subsystem components, such as processors in CPU clusters 206 and various peripheral device subsystems, such as camera, video, display, audio, and wireless communication subsystems 218, 220, 222, 232, 234 and may also include other specialized processors, such as a graphics processor unit (GPU) 210, a modem digital signal processor (DSP) 212, an application processor unit (APU) 214, and other hardware accelerators. The communication components may facilitate communication between the peripheral device subsystems 218, 220, 222, 232, 234 and the processors 206, 210, 212, 214 with other components such as memory devices, including a system cache 202, a random access memory (RAM) 228, and various memories included in the processors 206, 210, 212, 214, such as caches of the processors 206, 210, 212, 214.

Various memory control devices, such as a system cache controller 204, a memory interface 216, and a memory controller 226, may be configured to control access to the various memories by the peripheral device subsystems 218, 220, 222, 232, 234 and the processors 206, 210, 212, 214 and implement operations for the various memories, which may be requested by the peripheral device subsystems 218, 220, 222, 232, 234 and the processors 206, 210, 212, 214.

The peripheral device subsystems 218, 220, 222, 232, 234 may also include various controllers, sensors, receivers, transmitters, and dedicated memories, such as caches and memory registers, configured for controlling and implementing functionalities of the peripheral devices of the subsystems 218, 220, 222, 232, 234.

The descriptions herein of the SoC 230 and its various components illustrated in FIG. 2 are only meant to be examples and in no way limiting. Several of the components of the illustrated example SoC 230 may be variably configured, combined, and separated. Several of the components may be included in greater or fewer numbers and may be located and connected differently within the SoC 230 or separate from the SoC 230. Similarly, numerous other components, such as other memories, processors, peripheral device subsystems, interfaces, and controllers, may be included in the SoC 230 and in communication with the system cache controller 204 in order to access the system cache 202.

Figure 3:
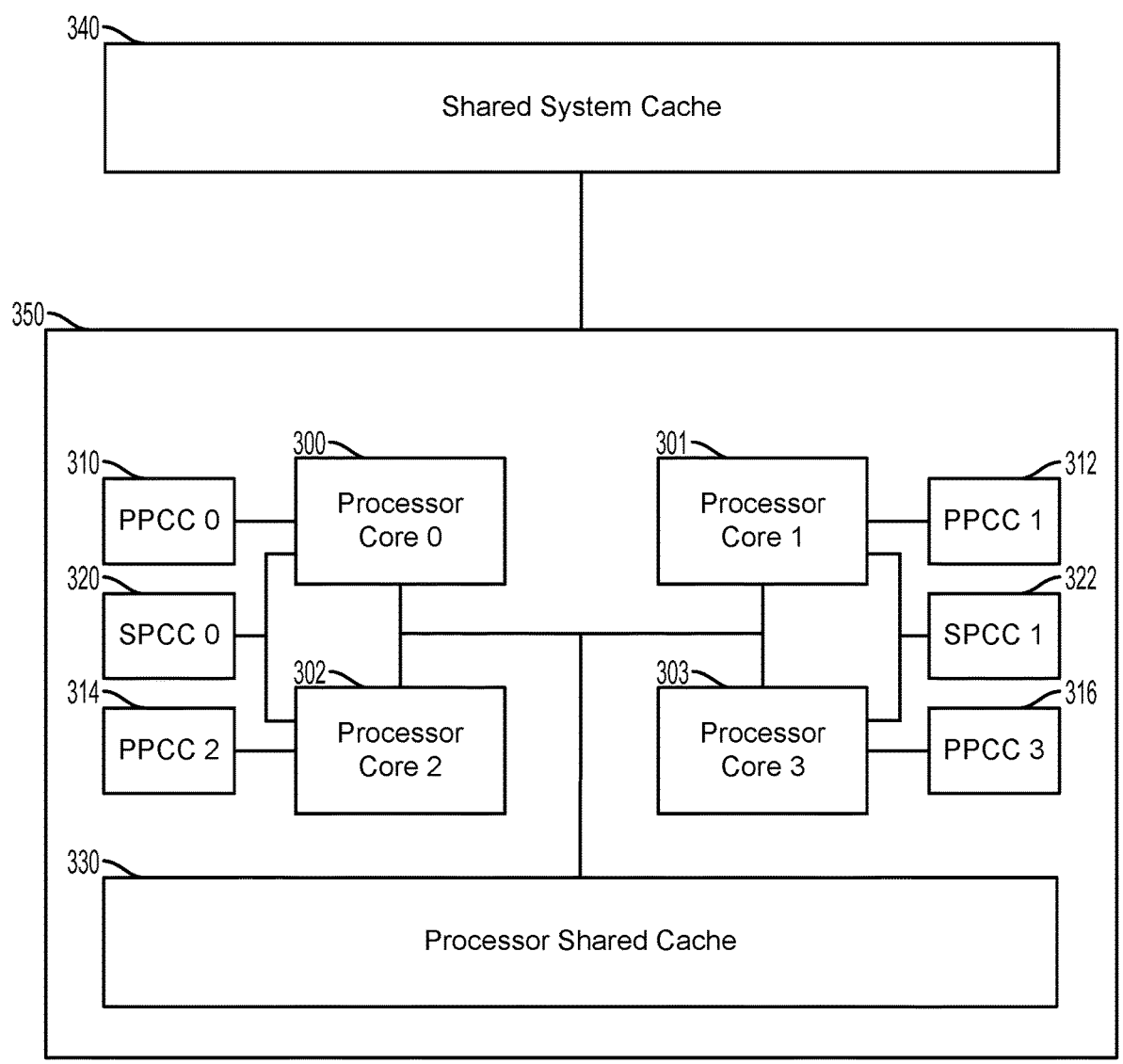
FIG. 3 is a component block diagram illustrating an example multicore processor suitable for implementing various embodiments.

FIG. 3 illustrates components of a computing device (e.g., computing device 100 in FIG. 1) suitable for implementing an embodiment. With reference to FIGS. 1-2, a processor 350 (e.g., general purpose processor 106, baseband modem processor 116, controllers/microcontrollers 108, 118, 130, processors in CPU clusters 206, GPU 210, DSP 212, APU 214, and processors of peripheral device subsystems 218, 220, 222, 232, 234 in FIGS. 1-2) may include multiple processor types, including, for example, a CPU and various hardware accelerators, such as a GPU, a DSP, an APU, a peripheral device subsystem processor, controllers/microcontrollers, etc. The processor 350 may also include a custom hardware accelerator, which may include custom processing hardware and/or general purpose hardware configured to implement a specialized set of functions. The processors 350 may include any number of processor cores 300, 301, 302, 303. A processor 350 having multiple processor cores 300, 301, 302, 303 may be referred to as a multicore processor.

The processor 350 may have a plurality of homogeneous or heterogeneous processor cores 300, 301, 302, 303. A homogeneous processor may include a plurality of homogeneous processor cores. The processor cores 300, 301, 302, 303 may be homogeneous in that, the processor cores 300, 301, 302, 303 of the processor 350 may be configured for the same purpose and have the same or similar performance characteristics. For example, the processor 350 may be a general purpose processor, and the processor cores 300, 301, 302, 303 may be homogeneous general purpose processor cores. The processor 350 may be a GPU or a DSP, and the processor cores 300, 301, 302, 303 may be homogeneous graphics processor cores or digital signal processor cores, respectively. The processor 350 may be a custom hardware accelerator with homogeneous processor cores 300, 301, 302, 303.

A heterogeneous processor may include a plurality of heterogeneous processor cores. The processor cores 300, 301, 302, 303 may be heterogeneous in that the processor cores 300, 301, 302, 303 of the processor 350 may be configured for different purposes and/or have different performance characteristics. The heterogeneity of such heterogeneous processor cores may include different instruction set architecture, pipelines, operating frequencies, etc. An example of such heterogeneous processor cores may include what are known as "big.LITTLE" architectures in which slower, low-power processor cores may be coupled with more powerful and power-hungry processor cores. In similar embodiments, an SoC (for example, SoC 330 of FIG. 3) may include any number of homogeneous or heterogeneous processors 350. In various embodiments, not all off the processor cores 300, 301, 302, 303 need to be heterogeneous processor cores, as a heterogeneous processor may include any combination of processor cores 300, 301, 302, 303 including at least one heterogeneous processor core.

Each of the processor cores 300, 301, 302, 303 of a processor 350 may be designated a private processor core cache (PPCC) memory 310, 312, 314, 316 that may be dedicated for read and/or write access by a designated processor core 300, 301, 302, 303. The private processor core cache 310, 312, 314, 316 may store data and/or instructions, and make the stored data and/or instructions available to the processor cores 300, 301, 302, 303, to which the private processor core cache 310, 312, 314, 316 is dedicated, for use in execution by the processor cores 300, 301, 302, 303. The private processor core cache 310, 312, 314, 316 may include volatile memory.

Groups of the processor cores 300, 301, 302, 303 of a processor 350 may be designated a shared processor core cache (SPCC) memory 320, 322 that may be dedicated for read and/or write access by a designated group of processor core 300, 301, 302, 303. The shared processor core cache 320, 322 may store data and/or instructions, and make the stored data and/or instructions available to the group processor cores 300, 301, 302, 303 to which the shared processor core cache 320, 322 is dedicated, for use in execution by the processor cores 300, 301, 302, 303 in the designated group. The shared processor core cache 320, 322 may include volatile memory.

The processor 350 may include a shared processor cache memory 330 that may be dedicated for read and/or write access by the processor cores 300, 301, 302, 303 of the processor 350. The shared processor cache 330 may store data and/or instructions, and make the stored data and/or instructions available to the processor cores 300, 301, 302, 303, for use in execution by the processor cores 300, 301, 302, 303. The shared processor cache 330 may also function as a buffer for data and/or instructions input to and/or output from the processor 350. The shared cache 330 may include volatile memory.

Multiple processors 350 may access a shared system cache memory 340 (e.g., system cache 202 in FIG. 2) that may be dedicated for read and/or write access by the processor cores 300, 301, 302, 303 of the multiple processors 350. The shared system cache 340 may store data and/or instructions and make the stored data and/or instructions available to the processor cores 300, 301, 302, 303, for use in execution by the processor cores 300, 301, 302, 303. The shared system cache 340 may also function as a buffer for data and/or instructions input to and/or output from the multiple processors 350. The shared system cache 340 may include volatile memory.

In the example illustrated in FIG. 3, the processor 350 includes four processor cores 300, 301, 302, 303 (i.e., processor core 0, processor core 1, processor core 2, and processor core 3). In the example, each processor core 300, 301, 302, 303 is designated a respective private processor core cache 310, 312, 314, 316 (i.e., processor core 0 and private processor core cache 0, processor core 1 and private processor core cache 1, processor core 2 and private processor core cache 2, and processor core 3 and private processor core cache 3). The processor cores 300, 301, 302, 303 may be grouped, and each group may be designated a shared processor core cache 320, 322 (i.e., a group of processor core 0 and processor core 2 and shared processor core cache 0, and a group of processor core 1 and processor core 3 and shared processor core cache 1). For ease of explanation, the examples herein may refer to the four processor cores 300, 301, 302, 303, the four private processor core caches 310, 312, 314, 316, two groups of processor cores 300, 301, 302, 303, and the shared processor core cache 320, 322 illustrated in FIG. 3. However, the four processor cores 300, 301, 302, 303, the four private processor core caches 310, 312, 314, 316, two groups of processor cores 300, 301, 302, 303, and the shared processor core cache 320, 322 illustrated in FIG. 3 and described herein are merely provided as an example and in no way are meant to limit the various embodiments to a four-core processor system with four designated private processor core caches and two designated shared processor core caches 320, 322. The computing device 100, the SoC 330, or the processor 350 may individually or in combination include fewer or more than the four processor cores 300, 301, 302, 303 and private processor core caches 310, 312, 314, 316, and two shared processor core caches 320, 322 illustrated and described herein.

For ease of reference, the terms "hardware accelerator," "custom hardware accelerator," "multicore processor," "processor," "processor core," "controller," and "microcontroller" may be used interchangeably herein. The descriptions herein of the illustrated computing device and its various components are only meant to be exemplary and in no way limiting. Several of the components of the illustrated example computing device may be variably configured, combined, and separated. Several of the components may be included in greater or fewer numbers and may be located and connected differently within the SoC or separate from the SoC.

Various embodiments are described with reference to FIGS. 4-11 refer to example hardware components described with reference to FIGS. 1-3. The following references to combinations of hardware components are not intended to be limiting regarding the number or types of processors, hardware accelerators, controllers, and/or memories that may be included as hardware components for implementing the various embodiments described herein. Various embodiments may be implemented using any combination of components.

Figure 4:
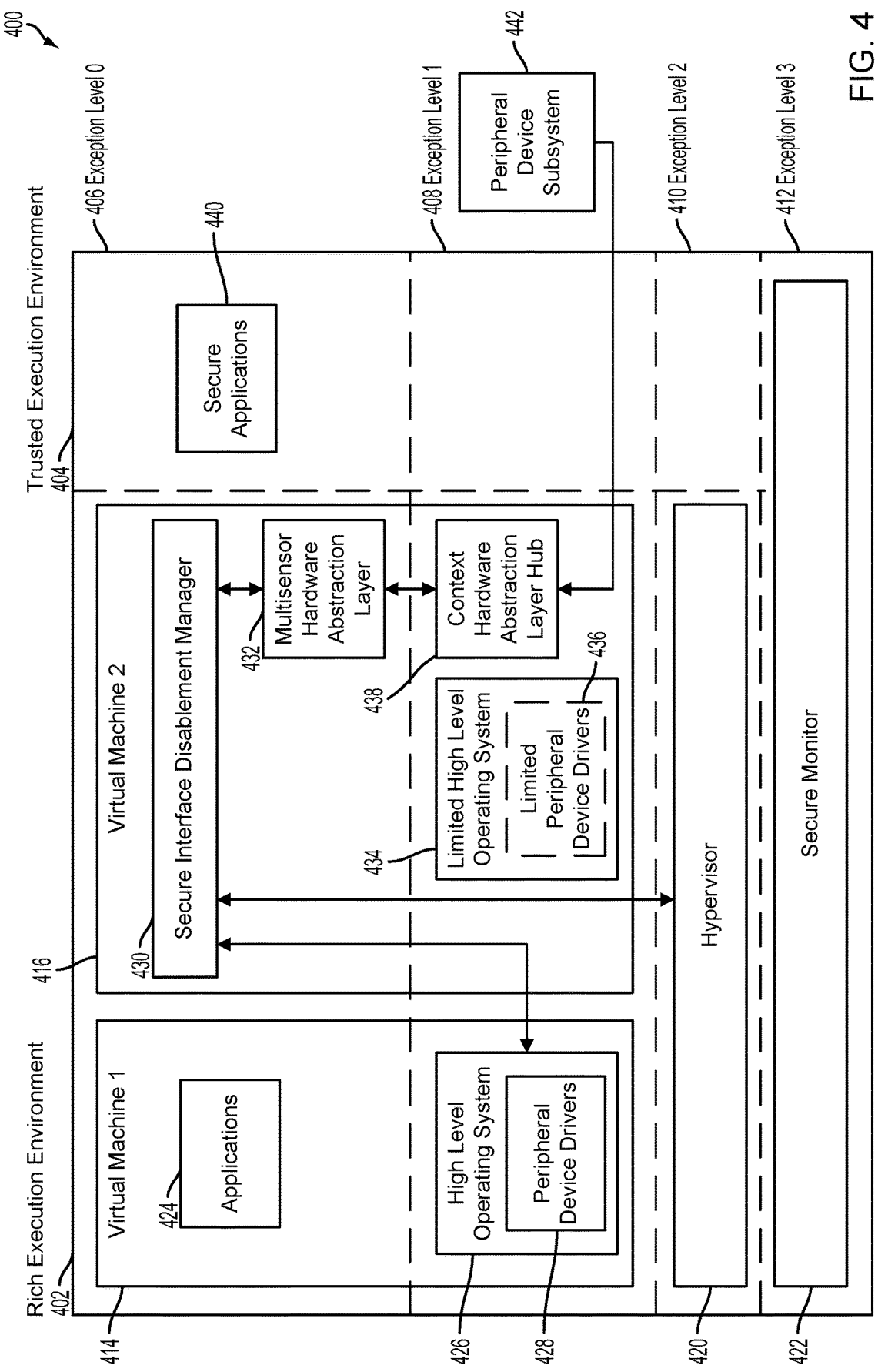
FIG. 4 is a component block diagram illustrating an example configuration of a computing device for secure peripheral interface disablement suitable for implementing various embodiments.

FIG. 4 illustrates an example configuration of a computing device 400 (e.g., computing device 100 in FIG. 1) for secure peripheral interface disablement suitable for implementing various embodiments. The configuration of the computing device 400 may be implemented using any number or combination of processors (e.g., general purpose processor 106, baseband modem processor 116, controllers/microcontrollers 108, 118, 130, processors in CPU clusters 206, GPU 210, DSP 212, APU 214, processors of peripheral device subsystems 218, 220, 222, 232, 234, processor cores 300, 301, 302, 303, and processor 350 in FIGS. 1-3). The configuration of the computing device 400 may be implemented using any number or combination of memories (e.g., memory 114, system cache 202, random access memory 228, private processor core caches 310, 312, 314, 316, shared processor core caches 320, 322, and shared system cache 340 in FIGS. 1-3).

The configuration of a computing device 400 may include various execution environments. An execution environment may include a rich execution environment 402, also referred to as a normal execution environment. An execution environment may include a trusted execution environment 404 (e.g., an ARM TrustZone execution environment), also referred to as a secure execution environment. The rich execution environment 402 may be configured to execute multiple virtual machines 414, 416 (e.g., virtual machine 1 and virtual machine 2). Each virtual machine 414, 416 may be configured with different permission to access resources of the computing device, and to execute different software. The virtual machine 414 may be configured to execute various software modules. In some embodiments, the software modules may include applications 424. In some embodiments, the software modules may include a high level operating system 426. Non-limiting examples of a high level operating system 426 include a Windows operating system, an Android operating system, a Chrome operating system, a Linux based operating system, and/or an iOS operating system. In some embodiments, the software modules may include peripheral device drivers 428. The virtual machine 416 may be configured to execute various software modules. In some embodiments, such software modules may include a secure interface disablement manager 430. In some embodiments, such software modules may include a multisensor hardware abstraction layer 432. In some embodiments, such software modules may include a context hardware abstraction layer hub 438. In some embodiments, such software modules may include a limited high level operating system 434. Non-limiting examples of a limited high level operating system 434 include a Windows operating system, an Android operating system, a Chrome operating system, a Linux based operating system, and/or an iOS operating system in a limited configuration. In some embodiments, such software modules may optionally include limited peripheral device drivers 436. The trusted execution environment 404 may be configured to execute a secure application 440.

The configuration of a computing device 400 may also include a hypervisor 420 configured to manage memory access requests from the executions by the virtual machines 414, 416. The computing device may also include a secure monitor 422 configured to control accesses to the trusted execution environment 404.

Different components of the configuration of a computing device 400 may be configured to execute within various exception levels 406, 408, 410, 412 which control execution privileges to the components executing within each exception level 406, 408, 410, 412. The exception levels 406, 408, 410, 412, from least amount to greatest amount of execution privileges may include, exception level 0, exception level 1, exception level 2, and exception level 3. In various embodiments, the hypervisor 420 executing in exception level 410 (exception level 2) may have greater execution privileges than the software modules executing in execution level 406 (execution level 0). In some embodiments, a software module executing in execution level 408 may include an application 424. In some embodiments, a software module executing in execution level 408 may include a secure application 440. In some embodiments, the hypervisor 420 executing in exception level 410 (exception level 2) may have greater execution privileges than the software modules executing in execution level 408 (execution level 1). In some embodiments, a software module executing in execution level 408 may include the high level operating system 426. In some embodiments, a software module executing in execution level 408 may include the peripheral device drivers 428. In some embodiments, a software module executing in execution level 408 may include the limited high level operating system 434. In some embodiments, a software module executing in execution level 408 may include the limited peripheral device drivers 436. The hypervisor 420 may have privileges to alter a stage 2 memory translation table (not shown) configured to translate intermediate physical addresses of memory access requests from the executions of the virtual machines 414, 416 to physical addresses in a memory. Conversely, the applications 424, secure application 440 executing in execution level 406, the high level operating system 426, peripheral device drivers 428, limited high level operating system 434, and limited peripheral device drivers 436 may not have privileges to alter the stage 2 memory translation table.

The configuration of a computing device 400 may further include a peripheral device subsystem 442. In some embodiments, the peripheral device subsystem 442 may include any combination of the peripheral device subsystem 218, 220, 222, 232, 234 illustrated in FIG. 2. The peripheral device subsystem 442 may receive an input configured to trigger disablement of any number of peripheral interfaces. The peripheral device subsystem 442 may transmit an indication of the input to the secure interface disablement manager 430 executed in the virtual machine 416 (virtual machine 2). For example, the peripheral device subsystem 442 may transmit an indication of the input to the secure interface disablement manager 430 via the context hardware abstraction layer hub 438 and the multisensor hardware abstraction layer 432. The secure interface disablement manager 430 may interpret the indication of the input and identify the peripheral interfaces to disable their associated peripheral devices. The secure interface disablement manager 430 may signal to the high level operating system 426 executed in the virtual machine 414 (virtual machine 1) to shut down the peripheral device drivers 428. In some embodiments, the signal from the secure interface disablement manager 430 to the high level operating system 426 may also signal the high level operating system 426 to unload the peripheral device drivers 428. The secure interface disablement manager 430 may also signal the hypervisor 420 to unmap the peripheral device drivers related to the input. In some embodiments, the peripheral device drivers related to the input may include all device drivers not necessary for executing the secure interface disablement manager 430. In some embodiments, the peripheral device drivers related to the input may include any subset of the device drivers not necessary for executing the secure interface disablement manager 430. The hypervisor may remove mappings for the intermediate physical addresses to the physical addresses of the relevant device drivers from the stage 2 memory translation table. In some embodiments, the limited high level operating system 434 may be executed in the virtual machine 416 (virtual machine 2) and may optionally execute limited peripheral device drivers 436 not necessary for executing the secure interface disablement manager 430. In some embodiments, the high level operating system 426 executed in the virtual machine 414 (virtual machine 1) may access virtualized peripheral device drivers by routing access to the limited peripheral device drivers 436 through the virtual machine 416 (virtual machine 2). The virtual machine 416 (virtual machine 2) may be headless so that a user cannot interact with the items executed in the virtual machine 416 (virtual machine 2) via a user interface.

As a non-limiting example, the peripheral device subsystem 442 may be a Bluetooth SoC. The input received by the Bluetooth SoC may be a Bluetooth beacon transmitted at a location for which the enterprise of the location desires to disable all the peripheral devices of the computing device. The secure interface disablement manager 430 may signal to the high level operating system 426 executed in the virtual machine 414 (virtual machine 1) to shut down and unload all the peripheral device drivers 428. The secure interface disablement manager 430 may also signal the hypervisor 420 to unmap all device drivers not necessary for executing the secure interface disablement manager 430.

In various embodiments, the peripheral device subsystem 442 may receive an input. In some embodiments, the input may be configured to trigger enablement of any number of peripheral interfaces. In some embodiments, the input may be configured to trigger disablement of any number of peripheral interfaces. In some embodiments, the peripheral device subsystem 442 may cease to receive the input. In various embodiments, the peripheral device subsystem 442 may transmit an indication of the input to the secure interface disablement manager 430 executed in the virtual machine 416 (virtual machine 2). For example, the peripheral device subsystem 442 may transmit an indication of the input to the secure interface disablement manager 430 via the context hardware abstraction layer hub 438 and the multisensor hardware abstraction layer 432. In some embodiments, the peripheral device subsystem 442 may cease to transmit the indication of the input to the secure interface disablement manager 430 executed in the virtual machine 416 (virtual machine 2).

The secure interface disablement manager 430 may interpret the indication of the input and identify the peripheral interfaces to enable in order to enable the associated peripheral devices. Similarly, the secure interface disablement manager 430 may interpret the lack of indication of the input and identify the peripheral interfaces to enable in order to enable the associated peripheral devices. The secure interface disablement manager 430 may signal to the high level operating system 426 executing in the virtual machine 414 (virtual machine 1), and the high level operating system 426 may load the peripheral device drivers 428. The secure interface disablement manager 430 may also signal the hypervisor 420 to map the memory for the peripheral device drivers related to the input. In some embodiments, the peripheral device drivers related to the input may include all device drivers not necessary for executing the secure interface disablement manager 430. In some embodiments, the peripheral device drivers related to the input any subset of the device drivers not necessary for executing the secure interface disablement manager 430. The hypervisor may add mappings for the intermediate physical addresses to the physical addresses of the relevant device drivers to the stage 2 memory translation table.

Figure 5:
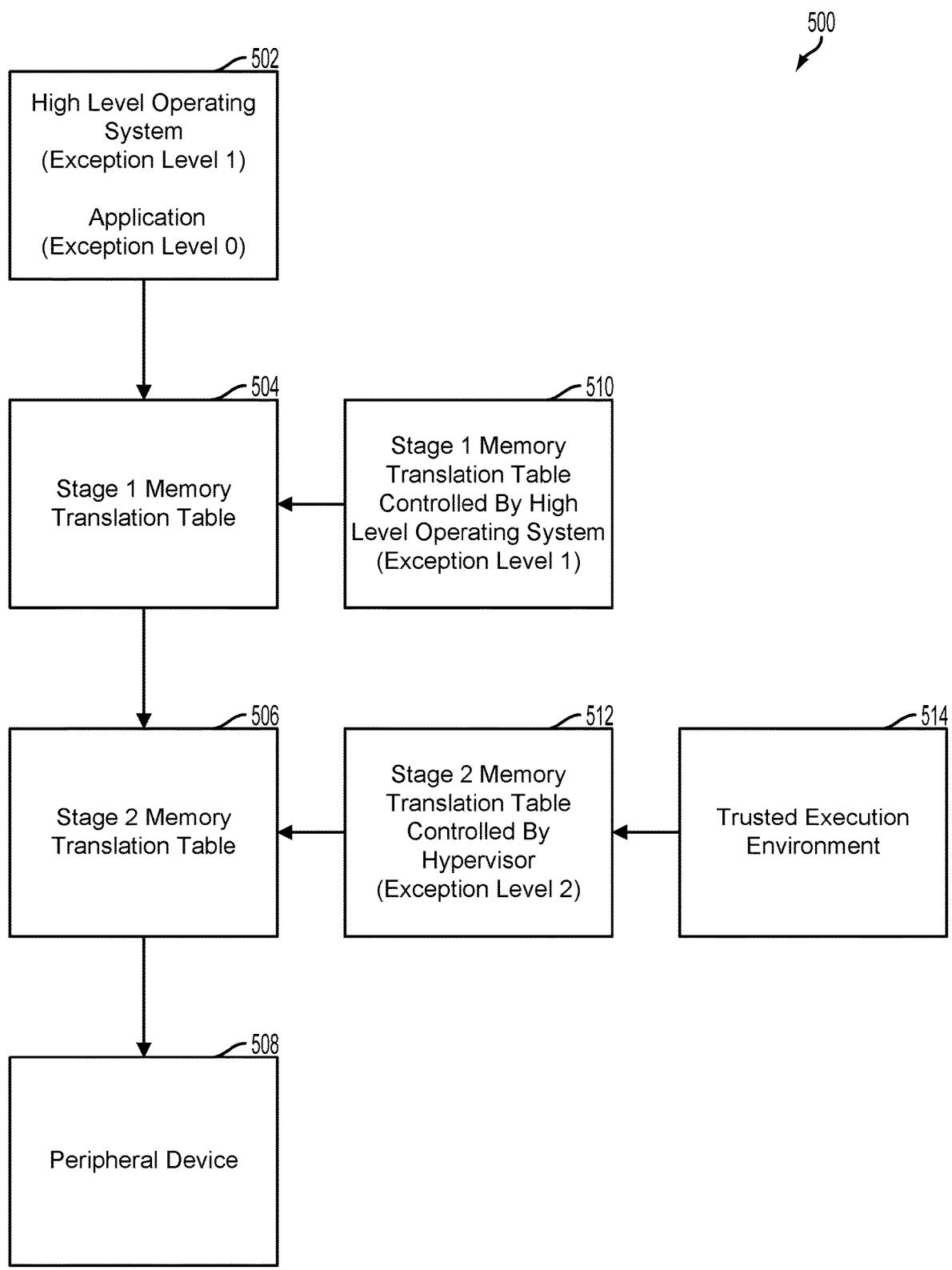
FIG. 5 is a component block and process flow diagram illustrating an example configuration of a computing device for secure peripheral interface disablement suitable for implementing various embodiments.

FIG. 5 illustrates an example configuration of a computing device 500 (e.g., computing device 100 in FIG. 1) for secure peripheral interface disablement suitable for implementing various embodiments. The configuration of the computing device 500 may be implemented using any number or combination of processors (e.g., general purpose processor 106, baseband modem processor 116, controllers/microcontrollers 108, 118, 130, processors in CPU clusters 206, GPU 210, DSP 212, APU 214, processors of peripheral device subsystems 218, 220, 222, 232, 234, processor cores 300, 301, 302, 303, and processor 350 in FIGS. 1-3). The configuration of the computing device 500 may be implemented using any number or combination of memories (e.g., memory 114, system cache 202, random access memory 228, private processor core caches 310, 312, 314, 316, shared processor core caches 320, 322, and shared system cache 340 in FIGS. 1-3).

In various embodiments, the configuration of a computing device 500 may execute a high level operating system at an exception level 1 (e.g., exception level 408 in FIG. 4) 502. Non-limiting examples of a high level operating system include a Windows operating system, an Android operating system, a Chrome operating system, a Linux based operating system, and/or an iOS operating system. In various embodiments, the configuration of a computing device 500 may execute an application at an exception level 0 (e.g., exception level 406 in FIG. 4) 502. In some embodiments, the configuration of a computing device 500 may execute both of the high level operating system and the application 502. In some embodiments, the high level operating system may request access to a peripheral device 508. In various embodiments, the application may request access to a peripheral device 508. In various embodiments, both of the high level operating system and the application may make requests for access to the peripheral device 508. The request for access to the peripheral device 508 may include a virtual address for a peripheral interface associated with the peripheral device 508.

A stage 1 memory translation table 504 may be configured to store mappings for virtual addresses to intermediate physical addresses. The stage 1 memory translation table 504 may be controlled by the high level operating system 510. The control of the memory translation table 504 may allow the high level operating system to identify an intermediate physical address for the peripheral interface mapped to the virtual address for the peripheral interface of the request for access to the peripheral device 508. In some embodiments this may be accomplished via a memory management unit (not shown).

A stage 2 memory translation table 506 may be configured to store mappings for intermediate physical addresses to physical addresses of a peripheral interface, such as a memory location. In some embodiments, the memory location may be for a memory register. In some embodiments, the memory location may be for a dedicated cache. In some embodiments, the memory location may be for a memory partition. The stage 2 memory translation table 506 may be controlled by a hypervisor 512 executing at an exception level 2 (e.g., exception level 410 in FIG. 4). The intermediate physical address for the peripheral interface may be transmitted to the hypervisor, which may identify a physical address for the peripheral interface mapped to the intermediate physical address for the peripheral interface of the request for access to the peripheral device 508. In some embodiments, the physical address for the peripheral interface may allow the high level operating system access to the peripheral device 508. In some embodiments, the physical address for the peripheral interface may allow the application access to the peripheral device 508.

In various embodiments, a high level operating system executing at exception level 1 does not have privileges to allow the high level operating system to modify the stage 2 memory translation table. In various embodiments, the application executing at exception level 0 does not have privileges to allow the application to modify the stage 2 memory translation table. The hypervisor executing at exception level 2 may have privileges to allow the hypervisor to modify the stage 2 memory translation table. A trusted execution environment 514, also referred to as a secure execution environment, may detect or receive a trigger for disabling a peripheral interface associated with the peripheral device 508. In some embodiments, the trusted execution environment 514 may include an ARM TrustZone implementation. In some embodiments, the trusted execution environment 514 may include a secure virtual machine.

The trusted execution environment 514 may transmit to the hypervisor a request to disable the peripheral interface. In response, the hypervisor may modify the stage 2 memory translation table to remove a mapping of the intermediate physical address for the peripheral interface to the physical address for the peripheral interface. In some embodiments, the high level operating system will be denied access to the peripheral device 508 associated with the disabled peripheral interface. In some embodiments, an application will be denied access to the disabled peripheral device 508 associated with the peripheral interface. Rather than accessing the peripheral device 508, a request to access the peripheral device 508 may trigger a memory exception.

The trusted execution environment 514 may detect or receive a trigger for enabling a peripheral interface associated with the peripheral device 508. The trusted execution environment 514 may transmit to the hypervisor a request to enable the peripheral interface. In response, the hypervisor may modify the stage 2 memory translation table to add a mapping of the intermediate physical address for the peripheral interface to the physical address for the peripheral interface. In some embodiments, the high level operating system may be able to access to the enabled peripheral device 508 associated with the peripheral interface. In some embodiments, an application may be able to access to the enabled peripheral device 508 associated with the peripheral interface.

Figure 6:
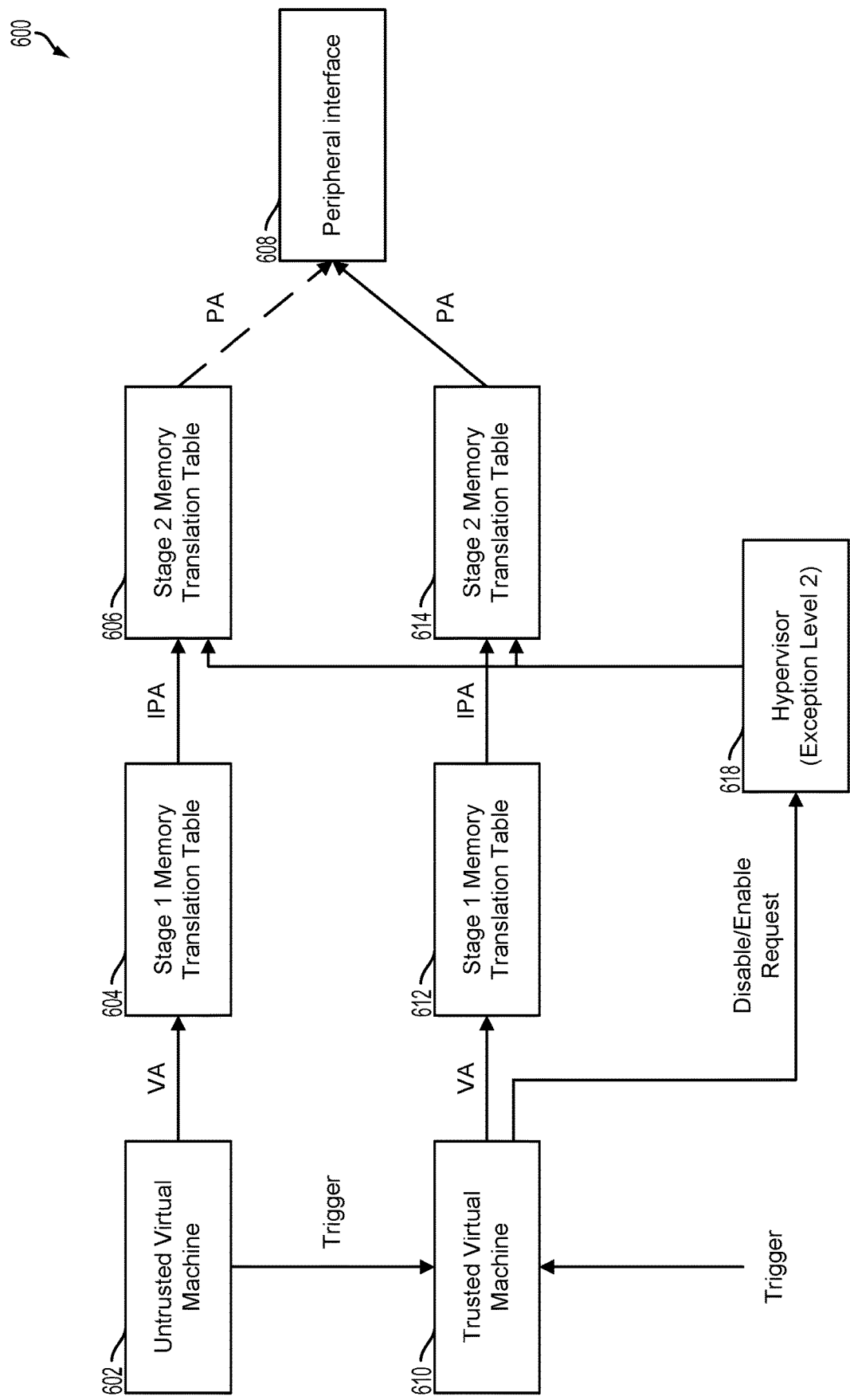
FIG. 6 is a component block and process flow diagram illustrating an example configuration of a computing device for secure peripheral interface disablement suitable for implementing various embodiments.

FIG. 6 illustrates an example configuration of a computing device 600 (e.g., computing device 100 in FIG. 1) for secure peripheral interface disablement suitable for implementing various embodiments. The configuration of the computing device 600 may be implemented using any number or combination of processors (e.g., general purpose processor 106, baseband modem processor 116, controllers/microcontrollers 108, 118, 130, processors in CPU clusters 206, GPU 210, DSP 212, APU 214, processors of peripheral device subsystems 218, 220, 222, 232, 234, processor cores 300, 301, 302, 303, and processor 350 in FIGS. 1-3). The configuration of the computing device 600 may be implemented using any number or combination of memories (e.g., memory 114, system cache 202, random access memory 228, private processor core caches 310, 312, 314, 316, shared processor core caches 320, 322, and shared system cache 340 in FIGS. 1-3).

The configuration of a computing device 600 may execute a high level operating system in an untrusted virtual machine 602. Non-limiting examples of a high level operating system that the computing device 600 may execute include a Windows operating system, an Android operating system, a Chrome operating system, a Linux based operating system, and/or an iOS operating system. Accesses to a peripheral interface 608, such as a location in a memory, by the high level operating system in the untrusted virtual machine 602 may be made directly via conventional multistage memory address translation, using any combination or memory management units.

In some embodiments, the high level operating system in the untrusted virtual machine 602 may make a peripheral interface access request to a peripheral interface 608 using a virtual address (VA) associated with the peripheral interface 608. The virtual address may be translated to an intermediate physical address (IPA) using a stage 1 memory translation table 604, which may be accessed by the high level operating system in the untrusted virtual machine 602. In various embodiments, translation of the virtual address to the intermediate physical address may be implemented by a stage 1 memory management unit. The stage 1 memory translation table 604 may store a mapping of the virtual address to the intermediate physical address. The intermediate physical address may be translated to a physical address (PA) using a stage 2 memory translation table 606. In various embodiments, translation of the intermediate physical address to the physical address may be implemented by a stage 2 memory management unit managed by a hypervisor 618 executing at exception level 2. The stage 2 memory translation table 606 may not be accessed by the high level operating system in the untrusted virtual machine 602. The stage 2 memory translation table 606 may store a mapping of the intermediate physical address to the physical address. The access to the peripheral interface 608 may be implemented using the physical address.

In some embodiments, a high level operating system in a trusted virtual machine 610 may make a peripheral interface access request to the peripheral interface 608 using the virtual address (VA) associated with the peripheral interface 608. Again, non-limiting examples of a high level operating system include a Windows operating system, an Android operating system, a Chrome operating system, a Linux based operating system, and/or an iOS operating system. The virtual address may be translated to an intermediate physical address (IPA) using a stage 1 memory translation table 614, which may be accessed by the high level operation system in the trusted virtual machine 610. In various embodiments, translation of the virtual address to the intermediate physical address may be implemented by a stage 1 memory management unit. The stage 1 memory translation table 614 may store a mapping of the virtual address to the intermediate physical address. The intermediate physical address may be translated to a physical address (PA) using a stage 2 memory translation table 614. In various embodiments, translation of the intermediate physical address to the physical address may be implemented by a stage 2 memory management unit managed by the hypervisor 618 executing at exception level 2. The stage 2 memory translation table 614 may not be accessed by the high level operating system in the untrusted virtual machine 602 or in the trusted virtual machine 610. The stage 2 memory translation table 614 may store a mapping of the intermediate physical address to the physical address. The access to the peripheral interface 608 may be implemented using the physical address.

In some embodiments the hypervisor 618 may be executed in an exception level 2 (e.g., exception level 410 in FIG. 4). Being executed in exception level 2 may grant the hypervisor 618 privileges to modify the stage 2 memory translation tables 606 and 614. The hypervisor 618 may receive a request to disable the peripheral interface 608. For example, the hypervisor 618 may receive a request to unmap a memory location associated with the peripheral interface 608. The request to disable the peripheral interface 608 may be received in response to a trigger causing the secure interface disablement manager (e.g., secure interface disablement manager 430 in FIG. 4) executing in the high level operating system in a trusted virtual machine 610 to generate the request to disable access to the peripheral interface 608. In response, the hypervisor 618 may modify the stage 2 memory translation table 606 to remove a mapping of the intermediate physical address for the peripheral interface 608 to the physical address for the peripheral interface 608. While disabled, the high level operating system in the untrusted virtual machine 602 may be denied access to the peripheral interface 608. Rather than accessing the peripheral interface 608, a request to access the peripheral interface 608 may trigger a memory exception.

The hypervisor 618 may receive a request to enable the peripheral interface 608. For example, the hypervisor 618 may receive a request to map a memory location associated with the peripheral interface 608. The request to enable the peripheral interface 608 may be received in response to a trigger causing the secure interface disablement manager executing in the high level operating system in the trusted virtual machine 610 to generate the request to enable access to the peripheral interface 608. In response, the hypervisor 618 may modify the stage 2 memory translation table 606 to add a mapping of the intermediate physical address for the peripheral interface 608 to the physical address for the peripheral interface 608. While enabled, the high level operating system in the untrusted virtual machine 602 may be able to access to the peripheral interface 608.

In some embodiments, the trigger causing the secure interface disablement manager executing in the high level operating system in the trusted virtual machine 610 to generate the request to disable or enable access to the peripheral interface 608 may be generated by the high level operating system in the untrusted virtual machine 602. In some embodiments, the trigger causing the secure interface disablement manager executing in the high level operating system in the trusted virtual machine 610 to generate the request to disable or enable access to the peripheral interface 608 may be generated by an application in the untrusted virtual machine 602. In some embodiments, the trigger may be generated by another component of the computing device. For example, such a trigger may include a signal generated by hardware in response to a condition detected and/or signaled to the hardware. As another example, such a trigger may include a signal generated by software executing outside of the untrusted virtual machine 602 in response to a condition detected and/or signaled to the software. As another example, such a trigger may include a signal generated by firmware in response to a condition detected and/or signaled to the firmware.

Figure 7:
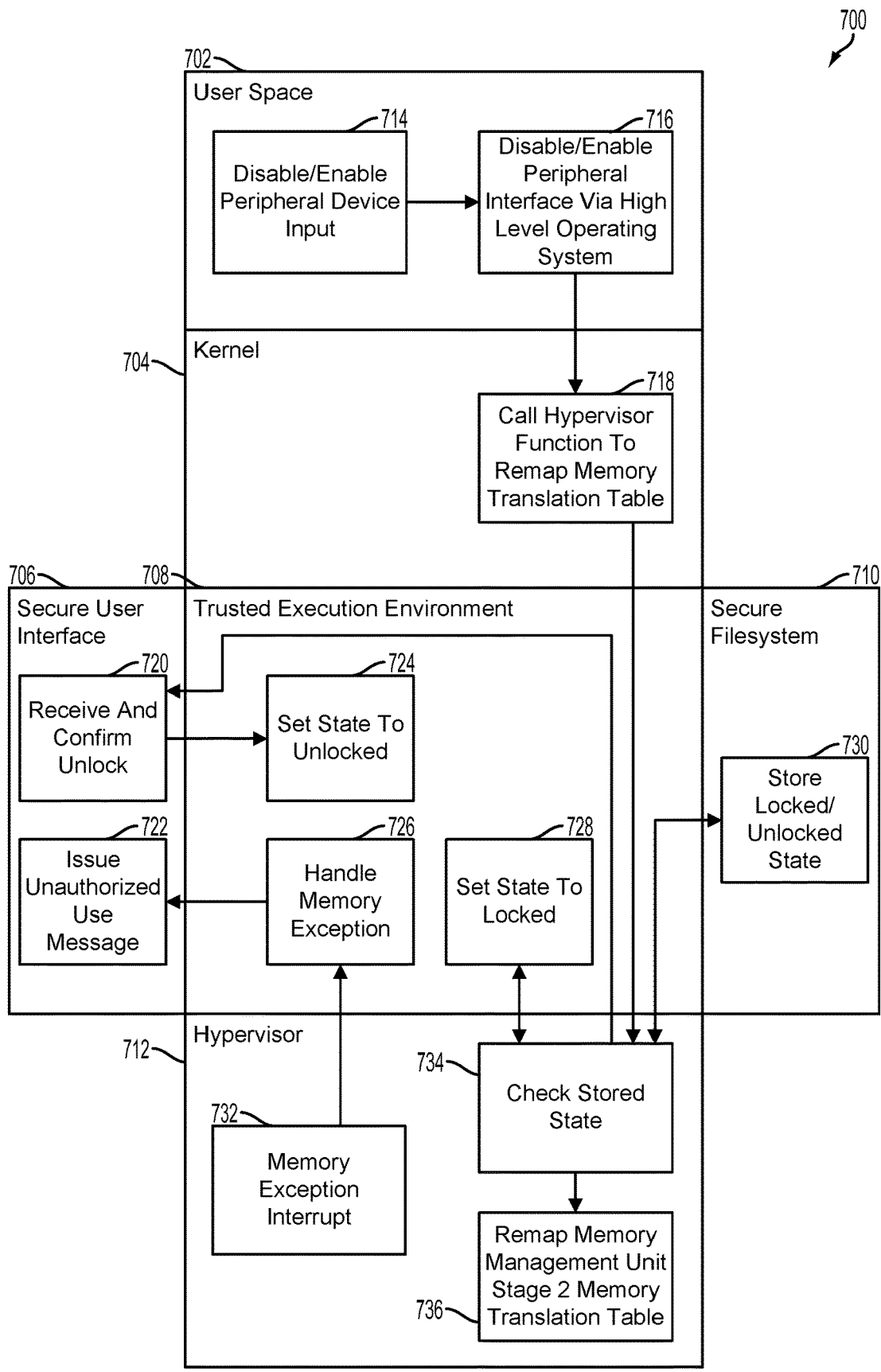
FIG. 7 is a component block and process flow diagram illustrating an example configuration of a computing device for secure peripheral interface disablement suitable for implementing various embodiments.

FIG. 7 illustrates an example configuration of a computing device 700 (e.g., computing device 100 in FIG. 1) for secure peripheral interface disablement suitable for implementing various embodiments. The configuration of the computing device 700 may be implemented using any number or combination of processors (e.g., general purpose processor 106, baseband modem processor 116, controllers/microcontrollers 108, 118, 130, processors in CPU clusters 206, GPU 210, DSP 212, APU 214, processors of peripheral device subsystems 218, 220, 222, 232, 234, processor cores 300, 301, 302, 303, and processor 350 in FIGS. 1-3). The configuration of the computing device 700 may be implemented using any number or combination of memories (e.g., memory 114, system cache 202, random access memory 228, private processor core caches 310, 312, 314, 316, shared processor core caches 320, 322, and shared system cache 340 in FIGS. 1-3).

The configuration of the computing device 700 may include a user space 702, a kernel 704, a secure user interface 706, a trusted execution environment 708, also referred to as a secure execution environment, a secure filesystem 710, and a hypervisor 712. In some embodiments, the trusted execution environment 708 may include an ARM TrustZone implementation. In some embodiments, the trusted execution environment 708 may include a secure virtual machine. In various embodiments, a high level operating system may be executed in the user space 702. In various embodiments, a high level operating system may be executed in the kernel 704. Non-limiting examples of high level operating systems that may be executed in the kernel 704 include a Windows operating system, an Android operating system, a Chrome operating system, a Linux based operating system, and/or an iOS operating system.

In the user space 702, the configuration of the computing device 700 may receive a user input 714. In some embodiments, the user input 714 may be to enable a peripheral device. In some embodiments, the user input 714 may be to disable a peripheral device. In various embodiments, the user input 714 may include a user interaction with the computing device 700. In some embodiments, the user interaction with the computing device 700 may include a user interaction with a touchscreen. In some embodiments, the user interaction with the computing device 700 may include a user interaction with a physical button. In some embodiments, the user interaction with the computing device 700 may include a user provided audible code. In some embodiments, the user interaction with the computing device 700 may include a user provided image. In some embodiments, the user interaction with the computing device 700 may include a user provided biometric token. In various embodiments, the user input 714 may be a signal for a predetermined peripheral device. In various embodiments, the user input 714 may be a signal configured to indicate a user selected peripheral device. In various embodiments, the user input 714 may be a signal configured to have a preset association with a peripheral device. In various embodiments, the user input 714 may be associated with more than just a single peripheral device. In the user space 702, the high level operating system may disable the high level operating system's access to a peripheral interface 716 associated with the peripheral device associated with the user input 714. Similarly, in the user space 702, the high level operating system may enable the high level operating system's access to a peripheral interface 716 associated with the peripheral device associated with the user input 714.

The high level operating system may also signal the disabling of the peripheral interface 716 to the kernel 704. Similarly, the high level operating system may also signal the enabling of the peripheral interface 716 to the kernel 704. In response, the kernel 704 may call a hypervisor function to remap a memory translation table 718. The hypervisor 712 may check a stored state of the peripheral interface 734 in the secure filesystem 710. In various embodiments, the stored state of the peripheral interface 730 may be locked, indicating that the peripheral interface is disabled. In various embodiments, the stored state of the peripheral interface 730 may be unlocked, indicating that the peripheral interface is enabled. In response to a disable request for a peripheral interface during a locked state of the peripheral interface, the hypervisor 712 may ignore the disable request. In response to a disable request for a peripheral interface during an unlocked state of the peripheral interface, the hypervisor 712 may remap a stage 2 memory translation table 736 to remove a mapping of an intermediate physical address for the peripheral interface to a physical address for the peripheral interface. The hypervisor 712 may also signal the trusted execution environment 708 to set the state of the peripheral interface to locked 728.

The secure user interface 706 may receive and confirm an unlock request for a peripheral device 720 from a user. In various embodiments, the unlock request may be a signal configured to indicate a user selected peripheral device to unlock. In various embodiments, the unlock request may be a signal that may have a preset association with a peripheral device to unlock. In various embodiments, the unlock request may be associated with more than just a single peripheral device. In response to an enable request for a peripheral interface during an unlocked state of the peripheral interface, the hypervisor 712 may ignore the enable request. In response to an enable request for a peripheral interface during a locked state of the peripheral interface, the hypervisor 712 may remap a stage 2 memory translation table 736 to add a mapping of an intermediate physical address for the peripheral interface to a physical address for the peripheral interface. The hypervisor 712 may also signal the secure execution environment 708 to set the state of the peripheral interface to unlocked 724.

To enable a peripheral device, the configuration of the computing device 700 may receive a user input 714 to enable the peripheral device in the user space 702. In various embodiments, the user input may be a signal configured to indicate a user selected peripheral device to unlock, including a peripheral device associated with the unlock request. In various embodiments, the user input may be a signal may have a preset association with a peripheral device to unlock, including a peripheral device associated with the unlock request. In various embodiments, the user input 714 may be associated with more than just a single peripheral device. In the user space 702, the high level operating system may enable the high level operating system's access to a peripheral interface 716 associated with the peripheral device associated with the user input 714. The high level operating system may also signal the enabling of the peripheral interface 716 to the kernel 704. In response, the kernel 704 may call a hypervisor function to remap a memory translation table 718. The hypervisor 712 may check the stored state of the peripheral interface 734 in the secure filesystem 710. In response to an enable request for an unlocked state, the hypervisor 712 may remap the stage 2 memory transla-tion table 736 to add a mapping of the intermediate physical address for the peripheral interface to the physical address for the peripheral interface.

While the peripheral interface is unmapped in the stage 2 memory translation table, the computing device may attempt to access the peripheral interface. In response, a memory management unit (not shown) may not locate the mapping of the intermediate physical address for the peripheral interface to the physical address for the peripheral interface in the stage 2 memory translation table. The memory management unit may issue a memory exception interrupt 732. In some embodiments, the trusted execution environment 708 may handle the memory exception interrupt 726, such as by logging and clearing the memory exception interrupt. In some embodiments, the hypervisor 712 may handle the memory exception interrupt 726, such as by logging and clearing the memory exception interrupt. Further, the secure user interface 706 may issue an unauthorized use message 722. The unauthorized use message may signal to the user of the computing device that attempting to access the peripheral device associated with the peripheral interface is no permitted at the time.

Figure 8:
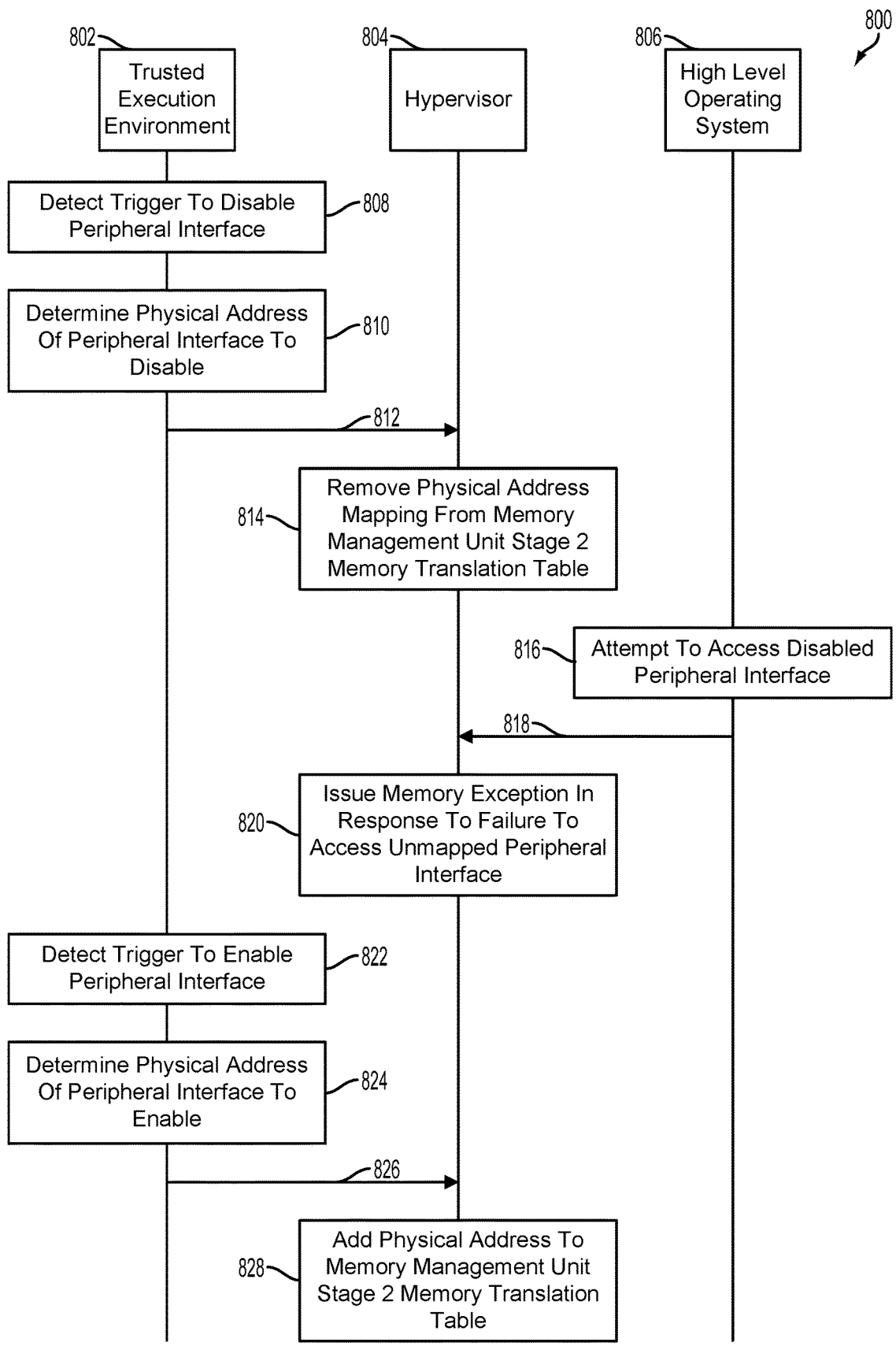
FIG. 8 is a component block and signal flow diagram illustrating secure peripheral interface disablement suitable for implementing various embodiments.

FIG. 8 illustrates an example computing device (e.g., computing device 100 in FIG. 1) component communications for secure peripheral interface disablement suitable for implementing various embodiments. The configuration of the computing device 800 may be implemented using any number or combination of processors (e.g., general purpose processor 106, baseband modem processor 116, controllers/microcontrollers 108, 118, 130, processors in CPU clusters 206, GPU 210, DSP 212, APU 214, processors of peripheral device subsystems 218, 220, 222, 232, 234, processor cores 300, 301, 302, 303, and processor 350 in FIGS. 1-3). The configuration of the computing device 700 may be implemented using any number or combination of memories (e.g., memory 114, system cache 202, random access memory 228, private processor core caches 310, 312, 314, 316, shared processor core caches 320, 322, and shared system cache 340 in FIGS. 1-3).

A trusted execution environment 802 (which may be referred to as a secure execution environment), a hypervisor 804, and a high level operating system 806 may communicate to implement secure peripheral interface disablement. The trusted execution environment 802 may include the trusted execution environment 404 of FIG. 4. The trusted execution environment 802 may include the trusted virtual machine 610 of FIG. 6. The trusted execution environment 802 may include the trusted execution environment 708 of FIG. 7. The hypervisor 804 may include the hypervisor 420 of FIG. 4. The hypervisor 804 may include the hypervisor 618 of FIG. 6. The hypervisor 804 may include the hypervisor 712 of FIG. 7. The high level operating system 806 may include the high level operating system 426 of FIG. 4. The high level operating system 806 may include the high level operating system 502 of FIG. 5. The high level operating system 806 may include the high level operating system 602 of FIG. 6. The trusted execution environment 802 may detect a trigger to disable a peripheral interface 808. In various embodiments, the trigger may be provided by a user of the computing device. In various embodiments, the trigger may be provided by an involuntary trigger to the computing device. In some embodiments, the involuntary trigger may be based on a signal received by the computing device. In some embodiments, the involuntary trigger may be based on context relating to the computing device. In various embodiments, the peripheral interface may be specified by the trigger. In various embodiments, the peripheral interface may be specially related to the trigger by the computing device. In various embodiments, the peripheral interface may be generally related to the trigger by the computing device. In other words, a trigger may indicate a peripheral interface. The computing device may match a peripheral interface with the trigger. The computing device may be configured to identify a peripheral interface for any trigger. In various embodiments, the peripheral interface may be more than a single peripheral interface.

The trusted execution environment 802 may determine a physical address of the peripheral interface to disable 810. The peripheral interface may be associated with a virtual address and that virtual address may be translated to an intermediate physical address, and the intermediate physical address translated to a physical address. Separate stages of mapping may be used to translate the virtual address to a physical address. A stage 1 memory translation table may be used to translate the virtual address to an intermediate physical address. A stage 2 memory translation table may be used to translate the intermediate physical address to a physical address. Thus, the physical address mapped to the intermediate physical address that is mapped to the virtual address of the peripheral interface is the physical address of the peripheral interface to disable.

The trusted execution environment 802 may request to unmap the peripheral interface to disable 812. The hypervisor 804 may receive the request to unmap the peripheral interface to disable 812. The hypervisor 804 may remove the mapping of the intermediate physical address to the physical address for the peripheral interface to disable from the stage 2 memory translation table 814. Removing the mapping may include disassociating the intermediate physical address and the physical address in the stage 2 memory translation table. Removing the mapping may include removing the intermediate physical address from the stage 2 memory translation table. Removing the mapping may include removing the physical address from the stage 2 memory translation table. The removal of the mapping of the intermediate physical address to the physical address for the peripheral interface from the stage 2 memory translation table may disable the peripheral interface by making it inaccessible.

While the peripheral interface is disabled the high level operating system 806 may attempt to access the disabled peripheral interface 816. To access the disabled peripheral interface, the high level operating system 806 may request access to the virtual address associated with the disabled peripheral interface 818. A memory management unit may translate the virtual address to the intermediate physical address. The memory management unit may attempt to translate the intermediate physical address to a physical address. However, the memory management unit may fail to translate the intermediate physical address to a physical address when the mapping of the intermediate physical address to the physical address for the peripheral interface from the stage 2 memory translation table is removed.

The memory management unit may issue a memory exception in response to failure to access the disabled/unmapped peripheral interface 820. In various embodiments, the memory exception may trigger a notification. The notification may be provided to the computing device, such as to the trusted execution environment 802. The notification may be provided to a user of the computing device. The notification may be provided to a monitor of a location implementing mobile device management to disable a peripheral device of computing devices. In some embodiments, the monitor of the location may be an automated computing device. In some embodiments, the monitor of the location may be a person monitoring the location.

The trusted execution environment 802 may detect a trigger to enable a peripheral interface 822. In various embodiments, the trigger may be provided by a user of the computing device. In various embodiments, the trigger may be an involuntary trigger to the computing device. In some embodiments, the involuntary trigger may be based on a signal received by the computing device. In some embodiments, the involuntary trigger may be based on context relating to the computing device. In various embodiments, the trigger may include a lack of involuntary trigger to the computing device. In various embodiments, the peripheral interface may be specified by the trigger. In various embodiments, the peripheral interface may be specially related to the trigger by the computing device. In various embodiments, the peripheral interface may be generally related to the trigger by the computing device. In other words, a trigger may indicate a peripheral interface. The computing device may match a peripheral interface with the trigger. The computing device may be configured to identify a peripheral interface for any trigger. In various embodiments the peripheral interface may be more than a single peripheral interface.

The trusted execution environment 802 may determine a physical address of the peripheral interface to enable 824. The peripheral interface may be associated with a virtual address and that virtual address may be translated to an intermediate physical address, and the intermediate physical address translated to a physical address. Separate stages of mapping may be used to translate the virtual address to a physical address. A stage 1 memory translation table may be used to translate the virtual address to an intermediate physical address. A stage 2 memory translation table may be used to translate the intermediate physical address to a physical address. Thus, the physical address mapped to the intermediate physical address that is mapped to the virtual address of the peripheral interface is the physical address of the peripheral interface to enable.

The trusted execution environment 802 may request to map the peripheral interface to enable 826. The hypervisor 804 may receive the request to map the peripheral interface to enable 826. The hypervisor 804 may add the mapping of the intermediate physical address to the physical address for the peripheral interface to enable to the stage 2 memory translation table 828. Adding the mapping may include associating the intermediate physical address and the physical address in the stage 2 memory translation table. Adding the mapping may include adding the intermediate physical address. Adding the mapping may include adding the physical address to the stage 2 memory translation table. The addition of the mapping of the intermediate physical address to the physical address for the peripheral interface from the stage 2 memory translation table may enable the peripheral interface by making it accessible.

Figure 9A:
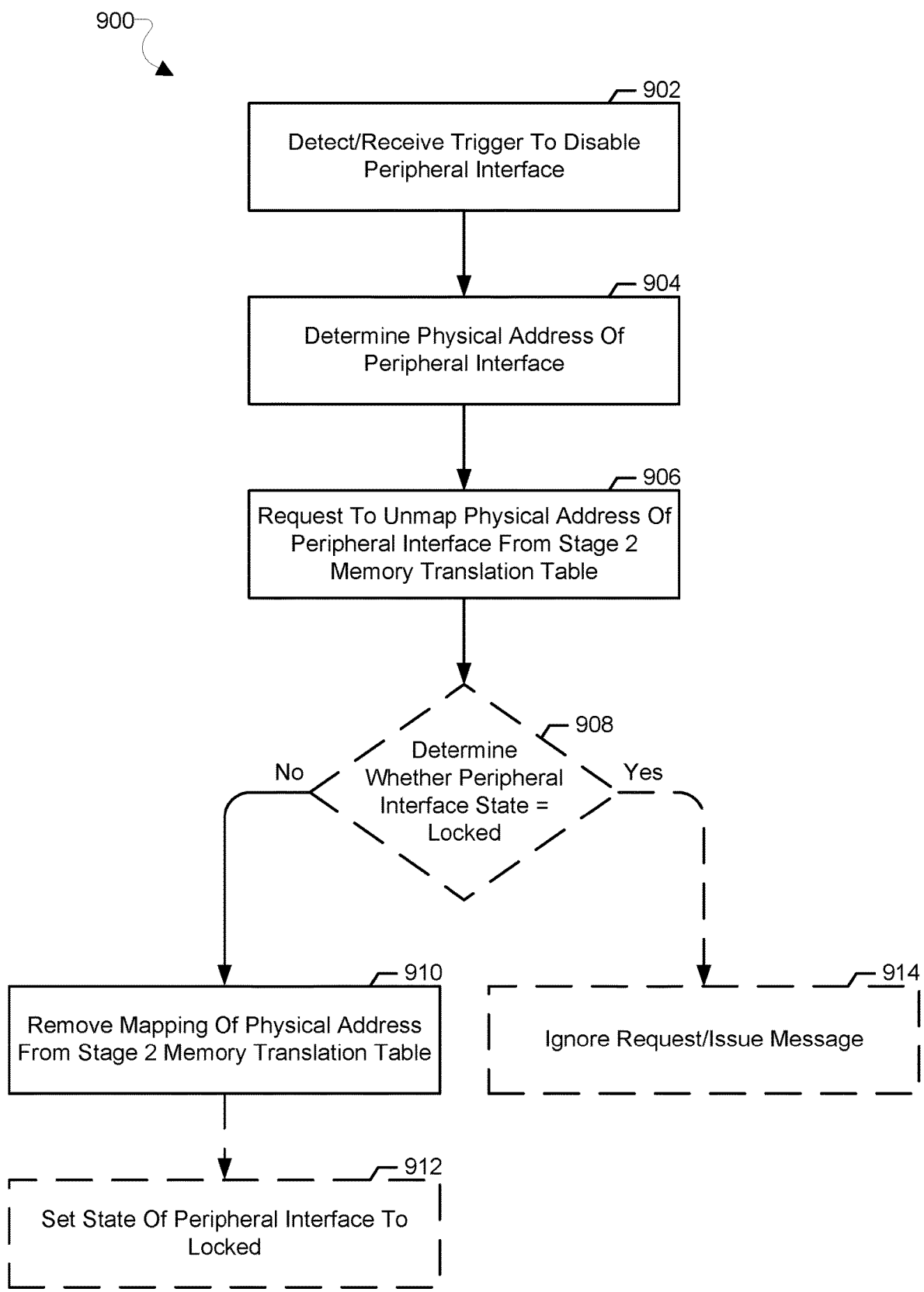
FIGS. 9A and 9B are process flow diagrams illustrating methods for secure peripheral interface disablement according to various embodiments.

FIG. 9A illustrates a method 900 for secure peripheral interface disablement according to an embodiment. The method 900 may be implemented in a computing device, in software executing in a processor (e.g., general purpose processor 106, baseband modem processor 116, controllers/microcontrollers 108, 118, 130, processors in CPU clusters 206, GPU 210, DSP 212, APU 214, processors of peripheral device subsystems 218, 220, 222, 232, 234, processor cores 300, 301, 302, 303, and processor 350 in FIGS. 1-3), in general purpose hardware, in dedicated hardware, or in a combination of a software-configured processor and dedicated hardware, such as a processor executing software within a computing device personalization diversity enabled system (e.g., configuration of a computing device 400, 500, 600, 700 in FIGS. 4-7) that includes other individual components (memory 114, system cache 202, random access memory 228, private processor core caches 310, 312, 314, 316, shared processor core caches 320, 322, and shared system cache 340 in FIGS. 1-3), and various memory/cache controllers (e.g., controller 204, 216, 226 illustrated in FIG. 2). In order to encompass the alternative configurations enabled in various embodiments, the hardware implementing the method 900 is referred to herein as a "processing device."

In block 902, the processing device may detect/receive a trigger to disable a peripheral interface. In various embodiments, the trigger may be provided by a user interacting with the computing device. In various embodiments, the trigger may be provided by an involuntary trigger to the computing device. In some embodiments, the involuntary trigger may be based on a signal received by the computing device. In some embodiments, the involuntary trigger may be based on context relating to the computing device. In various embodiments, the peripheral interface may be specified by the trigger. In various embodiments, the peripheral interface may be specially related to the trigger by the computing device. In various embodiments, the peripheral interface may be generally related to the trigger by the computing device. In other words, a trigger may indicate a peripheral interface. The computing device may match a peripheral interface with the trigger. The computing device may be configured to identify a peripheral interface for any trigger. In various embodiments the peripheral interface may be more than a single peripheral interface.

In, block 904, the processing device may determine a physical address of the peripheral interface. The peripheral interface may be associated with a virtual address and that virtual address may be translated to an intermediate physical address, and the intermediate physical address translated to a physical address. Separate stages of mapping may be used to translate the virtual address to a physical address. A stage 1 memory translation table may be used to translate the virtual address to an intermediate physical address. A stage 2 memory translation table may be used to translate the intermediate physical address to a physical address. Thus, the physical address mapped to the intermediate physical address that is mapped to the virtual address of the peripheral interface is the physical address of the peripheral interface to enable.

In block 906, the processing device may request to unmap the physical address of the peripheral interface from a stage 2 memory translation table.

In optional determination block 908, the processing device may determine whether the peripheral interface state is locked. The processing device may retrieve the peripheral interface state from a memory. The memory may include a state register in a secure location of the computing device. The secure location may include a secure filesystem of the computing device.

Following requesting to unmap the physical address of the peripheral interface from a stage 2 memory translation table in block 906, the processing device may remove the mapping of the intermediate physical address to the physical address for the peripheral interface from the stage 2 memory translation table in block 910. Similarly, in response to determining that the peripheral interface state is not locked (i.e., optional determination block 908="No"), the processing device may remove the mapping of the intermediate physical address to the physical address for the peripheral interface from the stage 2 memory translation table in block 910. Removing the mapping may include disassociating the intermediate physical address and the physical address in the stage 2 memory translation table. Removing the mapping may include removing the intermediate physical address from the stage 2 memory translation table. Removing the mapping may include removing the physical address from the stage 2 memory translation table. The removal of the mapping of the intermediate physical address to the physical address for the peripheral interface from the stage 2 memory translation table may disable the peripheral interface by making it inaccessible.

In optional block 912, the processing device may set the state of the peripheral interface to locked. The locked state of the peripheral interface may indicate to the computing device that the peripheral interface, and as a consequence the peripheral device associated with the peripheral interface, is disabled. The processing device may write the state of peripheral interface to the memory for storing the state.

In response to determining that the peripheral interface state is locked (i.e., optional determination block 908="Yes"), the processing device may ignore the request to unmap the physical address of the peripheral interface from a stage 2 memory translation table in optional block 914. Further, the processing device may issue a message to the user of the computing device that the peripheral interface state is locked. The processing device may issue a message to a monitor of a location implementing mobile device management that the peripheral interface state is locked. In some embodiments, the monitor of the location may be an automated computing device. In some embodiments, the monitor of the location may be a person monitoring the location.

In some embodiments, instead of the operations described above for optional determination block 908, the processing device may determine whether the peripheral interface state is locked in optional determination block 908 following the processing device detecting/receiving a trigger to disable a peripheral interface in block 902. As such, in response to determining that the peripheral interface state is not locked (i.e., optional determination block 908="No"), the processing device may determine a physical address of the peripheral interface in block 904. In response to determining that the peripheral interface state is locked (i.e., optional determination block 908="Yes"), the processing device may ignore the trigger to disable the peripheral interface in block 914. Further, the processing device may issue a message to the user of the computing device that the peripheral interface state is locked. The processing device may issue a message to a monitor of a location implementing mobile device management that the peripheral interface state is locked. In some embodiments, the monitor of the location may be an automated computing device. In some embodiments, the monitor of the location may be a person monitoring the location.

Figure 9B:
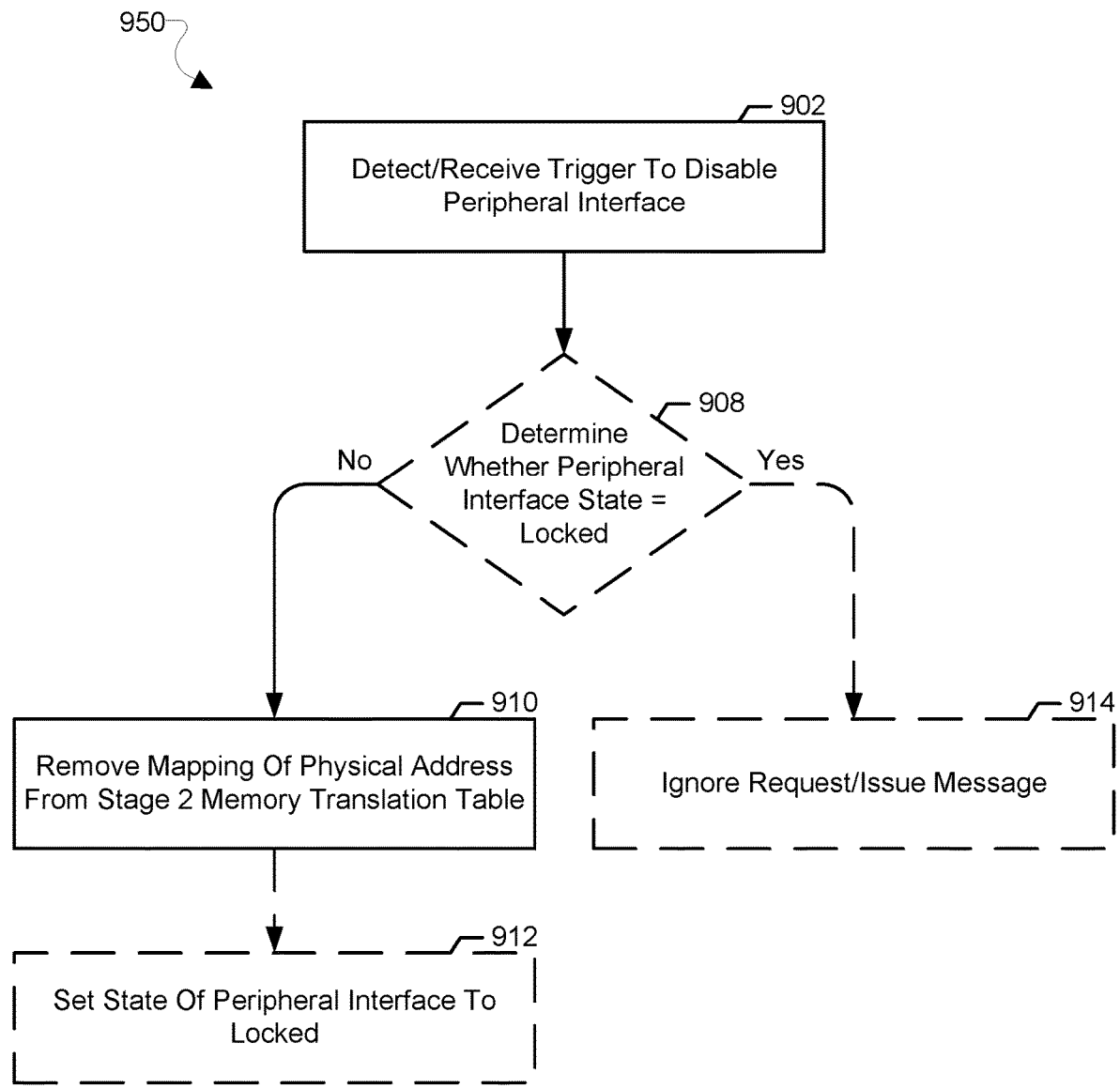
Figure 10:
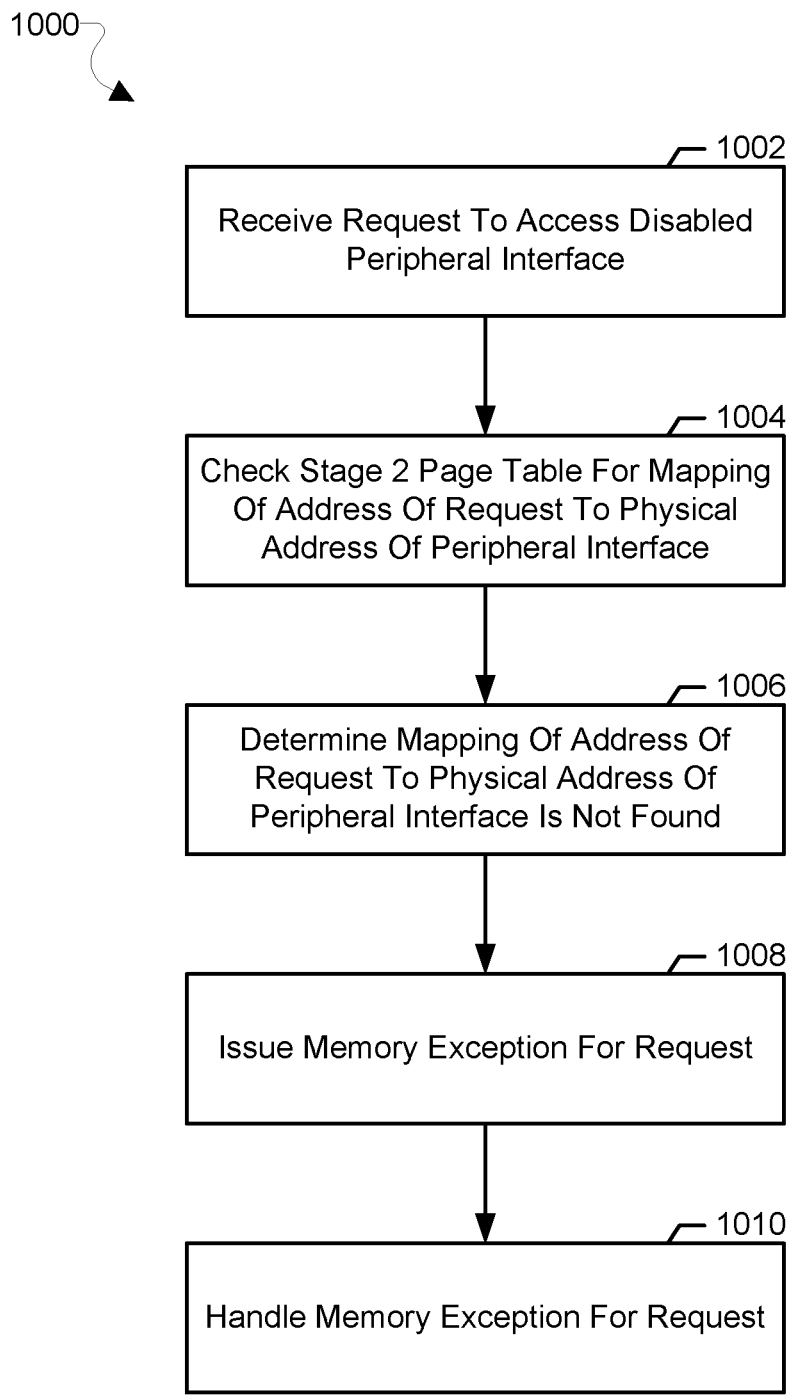
FIG. 10 is a process flow diagram illustrating a method for handling requests for a disabled peripheral interface according to various embodiments.

In some embodiments, the operations in blocks 904 and 906 may not be performed as in method 950 illustrated in the FIG. 9B FIG. 10 illustrates a method 1000 for secure peripheral interface disablement according to an embodiment. The method 1000 may be implemented in a computing device, in software executing in a processor (e.g., general purpose processor 106, baseband modem processor 116, controllers/microcontrollers 108, 118, 130, processors in CPU clusters 206, GPU 210, DSP 212, APU 214, processors of peripheral device subsystems 218, 220, 222, 232, 234, processor cores 300, 301, 302, 303, and processor 350 in FIGS. 1-3), in general purpose hardware, in dedicated hardware, or in a combination of a software-configured processor and dedicated hardware, such as a processor executing software within a computing device personalization diversity enabled system (e.g., configuration of a computing device 400, 500, 600, 700 in FIGS. 4-7) that includes other individual components (memory 114, system cache 202, random access memory 228, private processor core caches 310, 312, 314, 316, shared processor core caches 320, 322, and shared system cache 340 in FIGS. 1-3), and various memory/cache controllers (e.g., controller 204, 216, 226 illustrated in FIG. 2). In order to encompass the alternative configurations enabled in various embodiments, the hardware implementing the method 1000 is referred to herein as a "processing device."

In block 1002, the processing device may receive a request to access a disabled peripheral interface. In various embodiments, the request to access a disabled peripheral interface may result from a user interaction with the computing device. In various embodiments, the request to access a disabled peripheral interface may result from a legitimate application executing on the computing device. In various embodiments, the request to access a disabled peripheral interface may result from a high level operating system executing on the computing device. The high level operating system may include any of the high level operating systems 426, 502, 602, 806 of FIGS. 4-8. In various embodiments, the request to access a disabled peripheral interface may result from an illegitimate or malicious code executing on the computing device. In various embodiments, the request to access a disabled peripheral interface may result from a remote user interacting with the computing device. In some embodiments, the remote user may be an unauthorized intruder. The request access to access the disabled peripheral interface may include a virtual address associated with the disabled peripheral interface. In various embodiments, the virtual address may be translated to an intermediate physical address using a mapping of the virtual address to the intermediate physical address in a stage 1 memory translation table.

In block 1004, the processing device may check a stage 2 memory translation table for a mapping of the address of the request to access the disabled peripheral interface to a physical address of the disabled peripheral interface. In various embodiments, the address of the request to access the disabled peripheral interface may be the virtual address of the disabled peripheral interface, and may be translated to the intermediate physical address of the disabled peripheral interface to check the stage 2 memory translation table for the mapping to the physical address of the disabled peripheral interface. In various embodiments, the address of the request to access the disabled peripheral interface may be the intermediate physical address of the disabled peripheral interface. In either case, once the processing device acquires the intermediate physical address, the processing device may check for a mapping of the intermediate physical address to a physical address in the stage 2 memory translation table.

In block 1006, the processing device may determine that the mapping of the address of the request to access the disabled peripheral interface to the physical address of the disabled peripheral interface is not found. Failure to find the mapping of the address of the request to access the disabled peripheral interface to the physical address of the disabled peripheral interface may result from the intermediate physical address and the physical address being disassociated in the stage 2 memory translation table. Failure to find the mapping of the address of the request to access the disabled peripheral interface to the physical address of the disabled peripheral interface may result from the intermediate physical address missing from the stage 2 memory translation table. Failure to find the mapping of the address of the request to access the disabled peripheral interface to the physical address of the disabled peripheral interface may result from the physical address missing from the stage 2 memory translation table In block 1008, the processing device may issue a memory exception for the request to access the disabled peripheral interface. In various embodiments, the memory exception may trigger a notification to the computing device. In some embodiments, the notification may be provided to the processor. In some embodiments, the notification may be provided to a user of the computing device. In some embodiments, the notification may be provided to a monitor of a location implementing mobile device management to disable a peripheral device of computing devices. In some embodiments, the monitor of the location may be an automated computing device. In some embodiments, the monitor of the location may be a person monitoring the location. The notification may inform the receiving party that an attempt to access a disabled peripheral device is being made. The notification may also inform the receiving party that access the disabled peripheral device is unavailable. The notification may similarly inform the receiving party that access to the disabled peripheral device is not allowed according mobile device management policies.

In block 1010, the processing device may handle the memory exception for the request to access the disabled peripheral interface. In various embodiments, handling the memory exception may include logging the memory exception for the request to access the disabled peripheral interface. In various embodiments, handling the memory exception may include logging data relating to the request to access the disabled peripheral interface. In some embodiments, handling the memory exception may include clearing the exception from a buffer or register. In some embodiments, handling the memory exception may include resetting the processing. In some embodiments, handling the memory exception may include notifying the user. In some embodiments, handling the memory exception may include notifying the system administrator through the Mobile Device Management system.

Figure 11A:
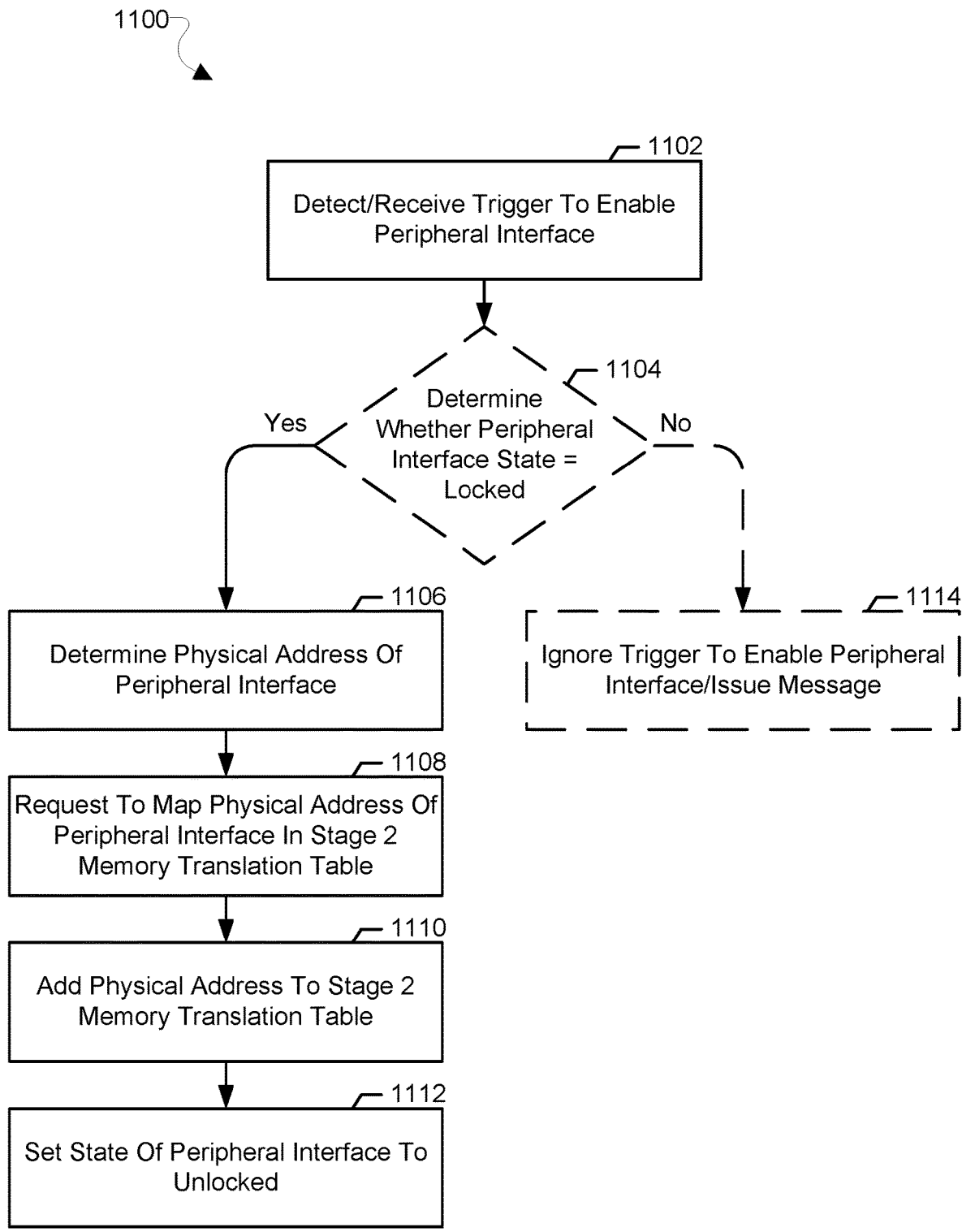
FIGS. 11A and 11B are process flow diagrams illustrating methods for secure peripheral interface enablement according to various embodiments.
Figure 11B:
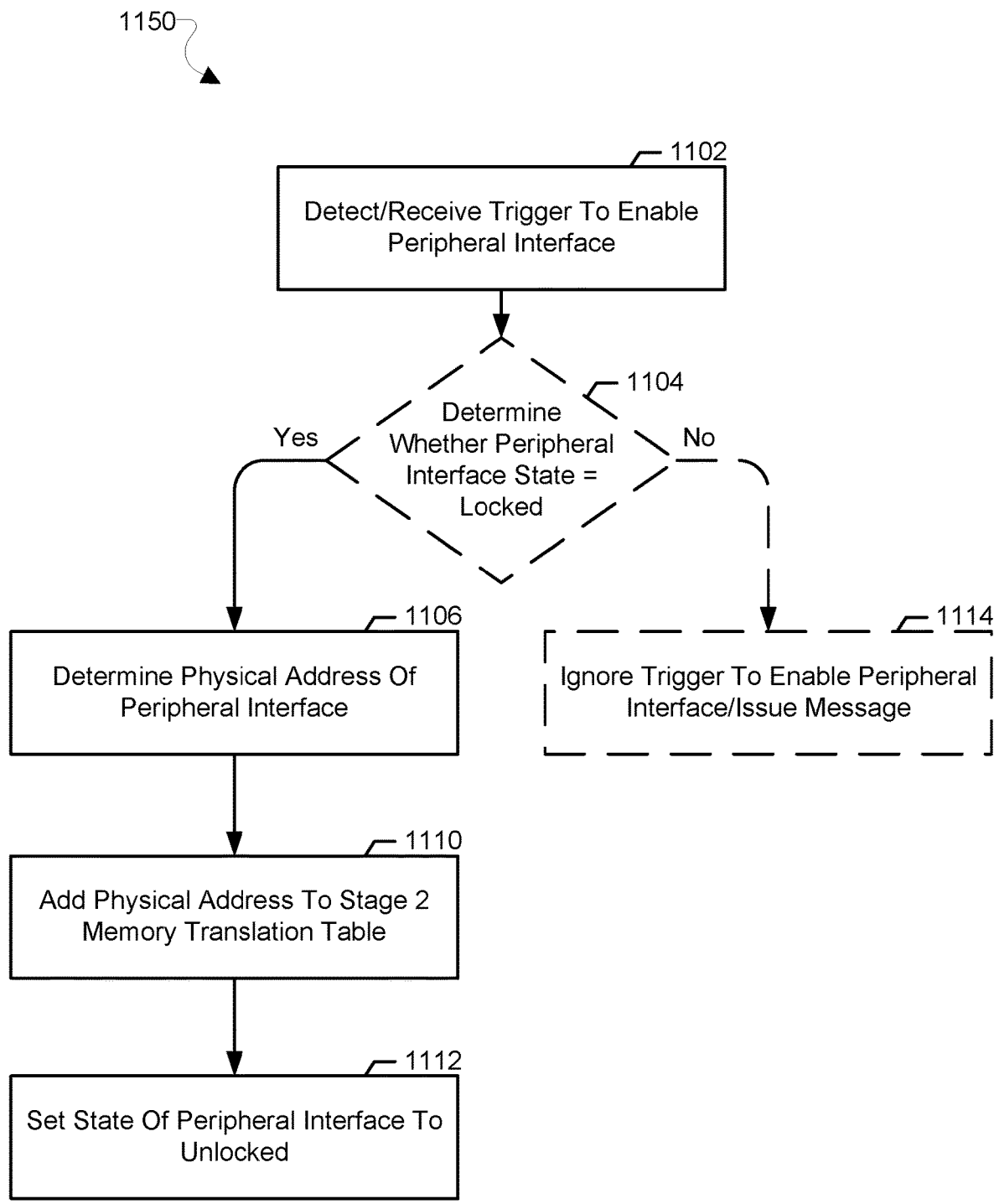

FIG. 11A illustrates a method 1100 for secure peripheral interface disablement according to an embodiment. The method 1100 may be implemented in a computing device, in software executing in a processor (e.g., general purpose processor 106, baseband modem processor 116, controllers/microcontrollers 108, 118, 130, processors in CPU clusters 206, GPU 210, DSP 212, APU 214, processors of peripheral device subsystems 218, 220, 222, 232, 234, processor cores 300, 301, 302, 303, and processor 350 in FIGS. 1-3), in general purpose hardware, in dedicated hardware, or in a combination of a software-configured processor and dedicated hardware, such as a processor executing software within a computing device personalization diversity enabled system (e.g., configuration of a computing device 400, 500, 600, 700 in FIGS. 4-7) that includes other individual components (memory 114, system cache 202, random access memory 228, private processor core caches 310, 312, 314, 316, shared processor core caches 320, 322, and shared system cache 340 in FIGS. 1-3), and various memory/cache controllers (e.g., controller 204, 216, 226 illustrated in FIG. 2). In order to encompass the alternative configurations enabled in various embodiments, the hardware implementing the method 1100 is referred to herein as a "processing device."

In block 1102, the processing device may detect/receive a trigger to enable a peripheral interface. In various embodiments, the trigger may be provided by a user interacting with the computing device. In various embodiments, the trigger may be provided by an involuntary trigger to the computing device. In some embodiments, the involuntary trigger may be based on a signal received by the computing device. In some embodiments, the involuntary trigger may be based on context relating to the computing device. In various embodiments, the trigger may be a lack of involuntary triggers to the computing device. In various embodiments, the peripheral interface may be specified by the trigger. In various embodiments, the peripheral interface may be specially related to the trigger by the computing device. In various embodiments, the peripheral interface may be generally related to the trigger by the computing device. In other words, a trigger may indicate a peripheral interface. The computing device may match a peripheral interface with the trigger. The computing device may be configured to identify a peripheral interface for any trigger. In various embodiments the peripheral interface may be more than a single peripheral interface.

In optional determination block 1104, the processing device may determine whether the peripheral interface state is locked. The processing device may retrieve the peripheral interface state from a memory. The memory may include a state register in a secure location of the computing device. The secure location may include a secure filesystem of the computing device. The determination of whether the peripheral interface state is locked in optional determination block 1104 may serve to confirm whether the trigger to enable a peripheral interface is legitimate. A trigger to enable a peripheral interface during a locked state of the peripheral interface may be legitimate. A trigger to enable a peripheral interface during an unlocked state of the peripheral interface may be illegitimate.

In response to determining that the peripheral interface state is locked (i.e., optional determination block 1104="Yes"), the processing device may determine a physical address of the peripheral interface in block 1106. The peripheral interface may be associated with a virtual address and that virtual address may be translated to an intermediate physical address, and the intermediate physical address translated to a physical address. Separate stages of mapping may be used to translate the virtual address to a physical address. A stage 1 memory translation table may be used to translate the virtual address to an intermediate physical address. A stage 2 memory translation table may be used to translate the intermediate physical address to a physical address. Thus, the physical address mapped to the intermediate physical address that is mapped to the virtual address of the peripheral interface is the physical address of the peripheral interface to enable.

In block 1108, the processing device may request to map the physical address of the peripheral interface to a stage 2 memory translation table.

In block 1110, the processing device may add the mapping of the intermediate physical address to the physical address for the peripheral interface from the stage 2 memory translation table. Adding the mapping may include associating the intermediate physical address and the physical address in the stage 2 memory translation table. Adding the mapping may include adding the intermediate physical address to the stage 2 memory translation table. Adding the mapping may include adding the physical address to the stage 2 memory translation table. The addition of the mapping of the intermediate physical address to the physical address for the peripheral interface to the stage 2 memory translation table may enable the peripheral interface by making it accessible.

In block 1112, the processing device may set the state of the peripheral interface to unlocked. The unlocked state of the peripheral interface may indicate to the computing device that the peripheral interface, and as a consequence the peripheral device associated with the peripheral interface, is and/or can be enabled. The processing device may write the state of peripheral interface to the memory for storing the state.

In response to determining that the peripheral interface state is not locked (i.e., optional determination block 1104="No"), the processing device may ignore the trigger to enable the peripheral interface in optional block 1114.

In some embodiments, instead of the description of optional determination block 1104 described above, the processing device may determine whether the peripheral interface state is locked in optional determination block 1104 following the processing device requesting to map the physical address of the peripheral interface to a stage 2 memory translation table in block 1108. As such, in response to determining that the peripheral interface state is locked (i.e., optional determination block 1104="Yes"), the processing device may add the mapping of the intermediate physical address to the physical address for the peripheral interface from the stage 2 memory translation table in block 1110. In response to determining that the peripheral interface state is not locked (i.e., optional determination block 1104="No"), the processing device may ignore the request to map the physical address of the peripheral interface to a stage 2 memory translation table in optional block 1114.

Figure 12:
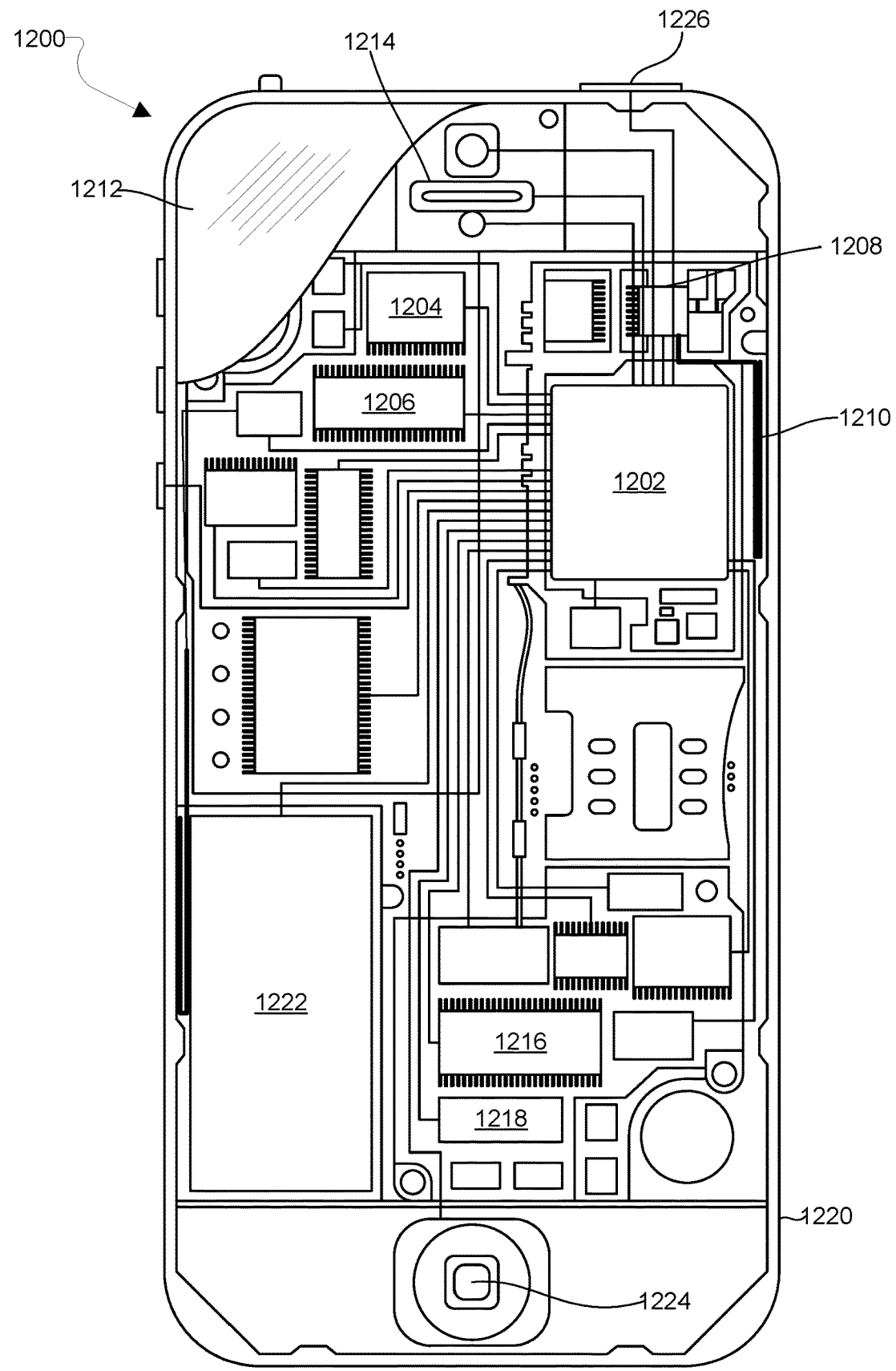
FIG. 12 is a component block diagram illustrating an example wireless communication device suitable for use with the various embodiments.

In some embodiments, the operation in block 1108 may not be performed as in method 1150 illustrated in the FIG. 11B The various embodiments (including, but not limited to, embodiments described above with reference to FIGS. 1-11B) may be implemented in a wide variety of computing systems including wireless communication devices, an example of which suitable for use with the various embodiments is illustrated in FIG. 12. The wireless communication device 1200 may include a processor 1202 coupled to a touchscreen controller 1204 and an internal memory 1206. The processor 1202 may be one or more multicore integrated circuits designated for general or specific processing tasks. The internal memory 1206 may be volatile or non-volatile memory and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 1204 and the processor 1202 may also be coupled to a touchscreen panel 1212, such as a resistive-sensing touchscreen, capacitive-sensing touchscreen, infrared sensing touchscreen, etc. Additionally, the display of the computing device 1200 need not have touch screen capability.

The wireless communication device 1200 may have one or more radio signal transceivers 1208 (e.g., Peanut, Bluetooth, ZigBee, Wi-Fi, RF radio) and antennae 1210, for sending and receiving communications, coupled to each other and/or to the processor 1202. The transceivers 1208 and antennae 1210 may be used with the above-mentioned circuitry to implement the various wireless transmission protocol stacks and interfaces. The wireless communication device 1200 may include a cellular network wireless modem chip 1216 that enables communication via a cellular network and is coupled to the processor.

The wireless communication device 1200 may include a peripheral device connection interface 1218 coupled to the processor 1202. The peripheral device connection interface 1218 may be singularly configured to accept one type of connection, or may be configured to accept various types of physical and communication connections, common or proprietary, such as Universal Serial Bus (USB), FireWire, Thunderbolt, or PCIe. The peripheral device connection interface 1218 may also be coupled to a similarly configured peripheral device connection port (not shown).

The wireless communication device 1200 may also include speakers 1214 for providing audio outputs. The wireless communication device 1200 may also include a housing 1220, constructed of a plastic, metal, or a combination of materials, for containing all or some of the components described herein. The wireless communication device 1200 may include a power source 1222 coupled to the processor 1202, such as a disposable or rechargeable battery. The rechargeable battery may also be coupled to the peripheral device connection port to receive a charging current from a source external to the wireless communication device 1200. The wireless communication device 1200 may also include a physical button 1224 for receiving user inputs. The wireless communication device 1200 may also include a power button 1226 for turning the wireless communication device 1200 on and off.

Figure 13:
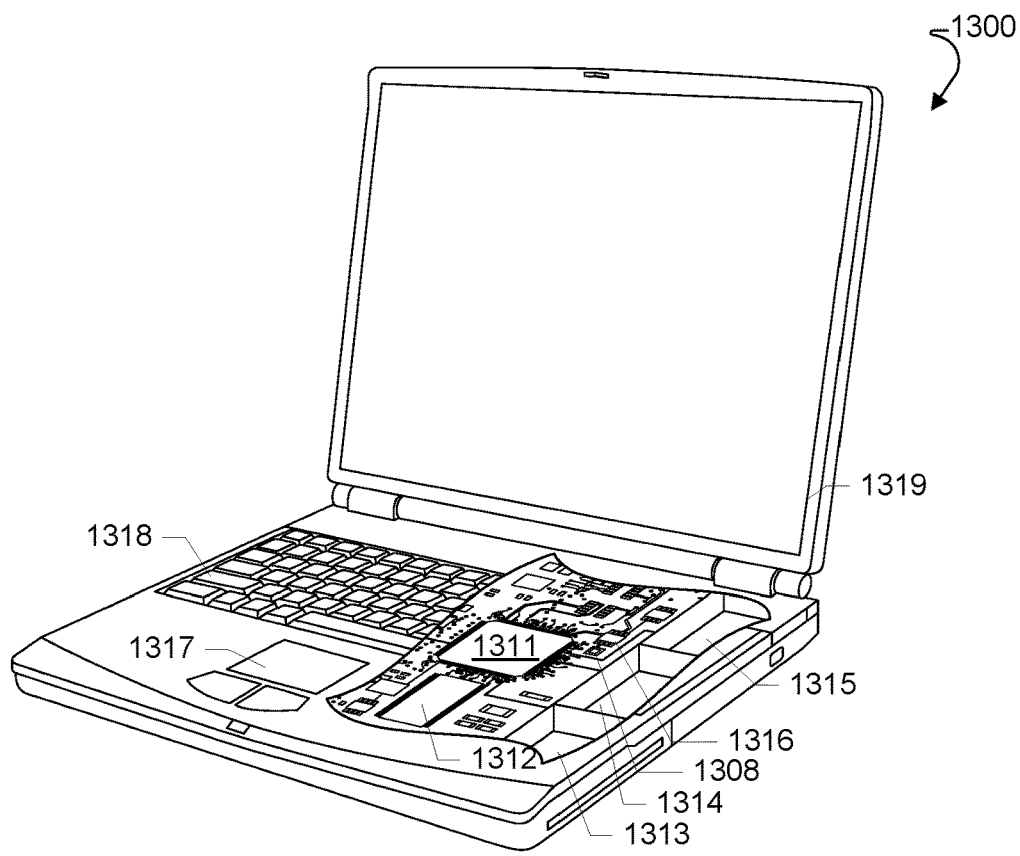
FIG. 13 is a component block diagram illustrating an example computing device suitable for use with the various embodiments.

The various embodiments (including, but not limited to, embodiments described above with reference to FIGS. 1-11) may be implemented in a wide variety of computing devices include a laptop computer 1300 an example of which is illustrated in FIG. 13. Many laptop computers include a touchpad touch surface 1317 that serves as the computer's pointing device, and thus may receive drag, scroll, and flick gestures similar to those implemented on computing devices equipped with a touch screen display and described above. A laptop computer 1300 will typically include a processor 1311 coupled to volatile memory 1312 and a large capacity nonvolatile memory, such as a disk drive 1313 of Flash memory. Additionally, the computer 1300 may have one or more antenna 1308 for sending and receiving electromagnetic radiation that may be connected to a wireless data link and/or cellular telephone transceiver 1316 coupled to the processor 1311. The computer 1300 may also include a floppy disc drive 1314 and a compact disc (CD) drive 1315 coupled to the processor 1311. In a notebook configuration, the computer housing includes the touchpad 1317, the keyboard 1318, and the display 1319 all coupled to the processor 1311. Other configurations of the computing device may include a computer mouse or trackball coupled to the processor (e.g., via a USB input) as are well known, which may also be used in conjunction with the various embodiments.

Figure 14:
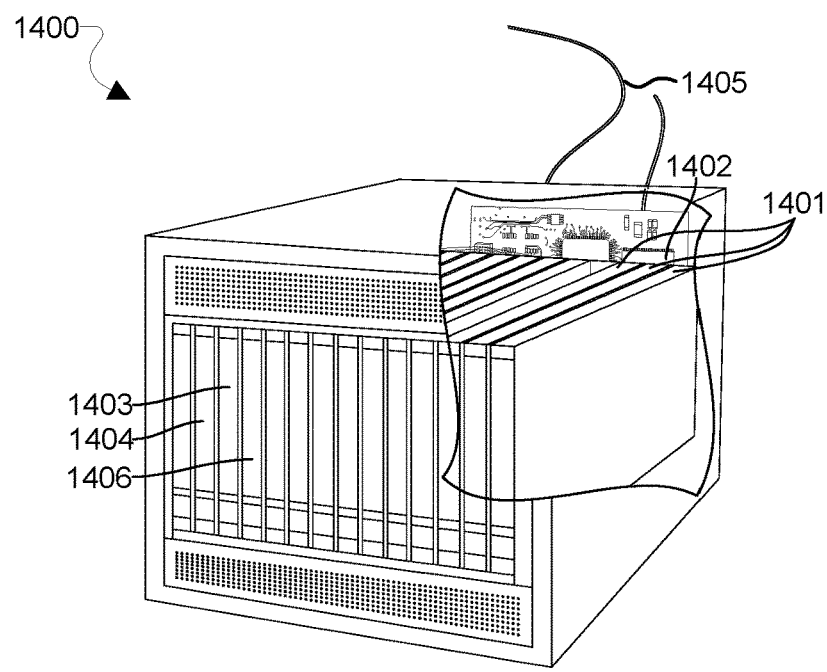
FIG. 14 is a component block diagram illustrating an example server suitable for use with the various embodiments.

The various embodiments (including, but not limited to, embodiments described above with reference to FIGS. 1-11) may also be implemented in fixed computing systems, such as any of a variety of commercially available servers. An example server 1400 is illustrated in FIG. 14. Such a server 1400 typically includes one or more multicore processor assemblies 1401 coupled to volatile memory 1402 and a large capacity nonvolatile memory, such as a disk drive 1404. As illustrated in FIG. 14, multicore processor assemblies 1401 may be added to the server 1400 by inserting them into the racks of the assembly. The server 1400 may also include a floppy disc drive, compact disc (CD) or digital versatile disc (DVD) disc drive 1406 coupled to the processor 1401. The server 1400 may also include network access ports 1403 coupled to the multicore processor assemblies 1401 for establishing network interface connections with a network 1405, such as a local area network coupled to other broadcast system computers and servers, the Internet, the public switched telephone network, and/or a cellular data network (e.g., CDMA, TDMA, GSM, PCS, 3G, 4G, LTE, or any other type of cellular data network).

Computer program code or "program code" for execution on a programmable processor for carrying out operations of the various embodiments may be written in a high level programming language such as C, C++, C#, Smalltalk, Java, JavaScript, Visual Basic, a Structured Query Language (e.g., Transact-SQL), Perl, or in various other programming languages. Program code or programs stored on a computer readable storage medium as used in this application may refer to machine language code (such as object code) whose format is understandable by a processor.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the various embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments disclosed herein may be implemented or performed with a general purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or a non-transitory processor-readable medium. The operations of a method or algorithm disclosed herein may be embodied in a processor-executable software module that may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments and implementations without departing from the scope of the claims. Thus, the present disclosure is not intended to be limited to the embodiments and implementations described herein, but is to be accorded the widest scope consistent with the following claims and the principles and novel features disclosed herein.

What is claimed is:

1. A method for secure peripheral interface disablement on a computing device to control use of the computing device, comprising:
    receiving a wireless signal from a computing device management software configured to wirelessly signal to the computing device in response to the computing device being located in a proximity of the location,
    wherein the wireless signal is configured to cause a trigger for disablement of a peripheral interface of a peripheral device on the computing device;
    receiving the trigger to disable the peripheral interface in response to receiving the wireless signal, wherein the trigger is configured to indicate the peripheral interface to the computing device;
    identifying a physical address of the peripheral interface;
    removing a mapping of an intermediate physical address of the peripheral interface to the physical address of the peripheral interface from a stage 2 memory translation table in response to receiving the trigger to disable the peripheral interface;
    setting a state of the peripheral interface as locked by a secure execution environment;
    storing the state of the peripheral interface at a secure location of the computing device; and
    enabling the peripheral interface by adding the mapping in response to detecting a lack of the wireless signal when the state of the peripheral interface is locked.

2. The method of claim 1, further comprising receiving a request to unmap the mapping of the intermediate physical address of the peripheral interface and the physical address of the peripheral interface in the stage 2 memory translation table,
    wherein removing the mapping of the intermediate physical address of the peripheral interface to the physical address of the peripheral interface from the stage 2 memory translation table in response to receiving the trigger to disable the peripheral interface comprises removing the mapping of the intermediate physical address of the peripheral interface to the physical address of the peripheral interface from the stage 2 memory translation table in response to receiving the trigger to disable the peripheral interface and receiving the request to unmap.

3. The method of claim 1, further comprising:
    receiving a request to access the peripheral interface;
    checking the stage 2 memory translation table for the mapping of the intermediate physical address of the peripheral interface to the physical address of the peripheral interface;
    determining that the mapping of the intermediate physical address of the peripheral interface to the physical address of the peripheral interface is not found in the stage 2 memory translation table; and
    issuing a memory exception in response to determining that the mapping of the intermediate physical address of the peripheral interface to the physical address of the peripheral interface is not found in the stage 2 memory translation table.

4. The method of claim 1, further comprising:
    receiving a trigger to enable the peripheral interface associated with the peripheral device of the computing device;
    receiving a request to map the intermediate physical address of the peripheral interface and the physical address of the peripheral interface in the stage 2 memory translation table; and
    adding the mapping of the intermediate physical address of the peripheral interface to the physical address of the peripheral interface in the stage 2 memory translation table in response to receiving the request to map.

5. The method of claim 4, further comprising:
    determining whether a state of the peripheral interface is locked,
    wherein adding the mapping of the intermediate physical address of the peripheral interface to the physical address of the peripheral interface in the stage 2 memory translation table comprises in response to determining that the state of the peripheral interface is locked:
        adding the mapping of the intermediate physical address of the peripheral interface to the physical address of the peripheral interface in the stage 2 memory translation table; and
        setting a state of the peripheral interface to unlocked in response to determining that the state of the peripheral interface is locked.

6. The method of claim 1, further comprising:
    signaling to a high level operating system executing on a first virtual machine to shut down and unload a peripheral device driver of the peripheral device; and executing a limited high level operating system on a second virtual machine excluding the peripheral device driver of the peripheral device.

7. The method of claim 1, further comprising receiving, from a trusted execution environment that is different from an execution environment in which a high level operating system is executing, a request to unmap or to map the intermediate physical address of the peripheral interface to the physical address of the peripheral interface in the stage 2 memory translation table.

8. The method of claim 1, further comprising accessing a peripheral device driver of the peripheral device executing in a trusted execution environment by a high level operating system executing in an execution environment via routing an access request to the peripheral device driver through the trusted execution environment.

9. The method of claim 1, further comprising accessing a peripheral device driver of the peripheral device executing in a first virtual machine by a high level operating system executing on a second virtual machine via routing an access request to the peripheral device driver through the first virtual machine.

10. A computing device configured for control via secure peripheral interface disablement, the computing device comprising:
 a memory; a peripheral device; a peripheral interface for communications with the peripheral device; and a processor communicatively connected to the memory and the peripheral interface and configured with processor-executable instructions to cause the processor to execute operations comprising:
 receiving a wireless signal from a computing device management software configured to wirelessly signal to the computing device in response to the computing device being located in a proximity of the location,
 wherein the wireless signal is configured to cause a trigger for disablement of the peripheral interface;
 receiving the trigger to disable the peripheral interface in response to receiving the wireless signal, wherein the triggers is configured to indicate the peripheral interface to the computing device;
 identifying a physical address of the peripheral interface;
 removing a mapping of an intermediate physical address of the peripheral interface to the physical address of the peripheral interface from a stage 2 memory translation table in response to receiving the trigger to disable the peripheral interface;
 setting a state of the peripheral interface as loved by a secure execution environment;
 storing the state of the peripheral interface at a secure location of the computing device; and
 enabling the peripheral interface by adding they mapping in response to detecting a lack of the wireless signal when the state of the peripheral interface is locked.

11. The computing device of claim 10, wherein:
 the processor is configured with processor-executable instructions to perform operations further comprising receiving a request to unmap the intermediate physical address of the peripheral interface and the physical address of the peripheral interface in the stage 2 memory translation table; and
 the processor is configured with processor-executable instructions to perform operations such that removing the mapping of the intermediate physical address of the peripheral interface to the physical address of the peripheral interface from the stage 2 memory translation table in response to receiving the trigger to disable the peripheral interface comprises removing the mapping of the intermediate physical address of the peripheral interface to the physical address of the peripheral interface from the stage 2 memory translation table in response to receiving the trigger to disable the peripheral interface and receiving the request to unmap.

12. The computing device of claim 10, wherein the processor is configured with processor-executable instructions to perform operations further comprising:
 receiving a request to access the peripheral interface;
 checking the stage 2 memory translation table for the mapping of the intermediate physical address of the peripheral interface to the physical address of the peripheral interface;
 determining that the mapping of the intermediate physical address of the peripheral interface to the physical address of the peripheral interface is not found in the stage 2 memory translation table; and
 issuing a memory exception in response to determining that the mapping of the intermediate physical address of the peripheral interface to the physical address of the peripheral interface is not found in the stage 2 memory translation table.

13. The computing device of claim 10, wherein the processor is configured with processor-executable instructions to perform operations further comprising:
 receiving a trigger to enable the peripheral interface associated with the peripheral device of the computing device;
 receiving a request to map the intermediate physical address of the peripheral interface and the physical address of the peripheral interface in the stage 2 memory translation table; and
 adding the mapping of the intermediate physical address of the peripheral interface to the physical address of the peripheral interface in the stage 2 memory translation table in response to receiving the request to map.

14. The computing device of claim 13, wherein:
 the processor is configured with processor-executable instructions to perform operations further comprising:
 determining whether a state of the peripheral interface is locked; and
 setting the state of the peripheral interface to unlocked in response to determining that the state of the peripheral interface is locked; and
 the processor is configured with processor-executable instructions to perform operations such that adding the mapping of the intermediate physical address of the peripheral interface to the physical address of the peripheral interface in the stage 2 memory translation table comprises adding the mapping of the intermediate physical address of the peripheral interface to the physical address of the peripheral interface in the stage 2 memory translation table in response to determining that the state of the peripheral interface is locked.

15. The computing device of claim 10, wherein the processor is configured with processor-executable instructions to perform operations further comprising:
 signaling to a high level operating system executing on a first virtual machine to shut down and unload a peripheral device driver of the peripheral device; and
 executing a limited high level operating system on a second virtual machine excluding the peripheral device driver of the peripheral device.

16. The computing device of claim 10, further comprising a trusted execution environment communicatively connected to the to the processor; and wherein the processor is configured with processor-executable instructions to perform operations further comprising receiving, from the trusted execution environment that is different from an execution environment in which a high level operating system is executing, a request to unmap or to map the intermediate physical address of the peripheral interface to the physical address of the peripheral interface in the stage 2 memory translation table.

17. The computing device of claim 10, further comprising:
a trusted execution environment communicatively connected to the to the processor; and
an execution environment communicatively connected to the to the processor,
wherein the processor is configured with processor-executable instructions to perform operations further comprising accessing a peripheral device driver of the peripheral device executing in the trusted execution environment by a high level operating system executing in the execution environment via routing an access request to the peripheral device driver through the trusted execution environment.

18. A computing device configured for control via secure peripheral interface disablement, the computing device, comprising:
means for receiving a wireless signal from a computing device management software configured to wirelessly signal to the computing device in response to the computing device being located in a proximity of the location,
wherein the wireless signal is configured to cause a trigger for disablement of a peripheral interface of a peripheral device on the computing device;
means for receiving the trigger to disable the peripheral interface in response to receiving the wireless a signal, wherein the trigger is configured to indicate the peripheral interface to the computing device;
means for identifying a physical address of the peripheral interface;
means for removing a mapping of an intermediate physical address of the peripheral interface to the physical address of the peripheral interface from a stage 2 memory translation table in response to receiving the trigger to disable the peripheral interface;
means for setting a state of the peripheral interface as locked by a secure execution environment;
means for storing the state of the peripheral interface at a secure location of the computing device; and
a means for enabling the peripheral interface by adding the mapping in response to detecting a lack of the wireless signal when the state of the peripheral interface is locked.

19. The computing device of claim 18, further comprising means for receiving a request to unmap the intermediate physical address of the peripheral interface and the physical address of the peripheral interface in the stage 2 memory translation table,
wherein means for removing the mapping of the intermediate physical address of the peripheral interface to the physical address of the peripheral interface from the stage 2 memory translation table in response to receiving the trigger to disable the peripheral interface comprises means for removing the mapping of the intermediate physical address of the peripheral interface to the physical address of the peripheral interface from the stage 2 memory translation table in response to receiving the trigger to disable the peripheral interface and receiving the request to unmap.

20. The computing device of claim 18, further comprising:
means for receiving a request to access the peripheral interface;
means for checking the stage 2 memory translation table for the mapping of the intermediate physical address of the peripheral interface to the physical address of the peripheral interface;
means for determining that the mapping of the intermediate physical address of the peripheral interface to the physical address of the peripheral interface is not found in the stage 2 memory translation table; and
means for issuing a memory exception in response to determining that the mapping of the intermediate physical address of the peripheral interface to the physical address of the peripheral interface is not found in the stage 2 memory translation table.

21. The computing device of claim 18, further comprising:
means for receiving a trigger to enable the peripheral interface associated with the peripheral device of the computing device;
means for receiving a request to map the intermediate physical address of the peripheral interface and the physical address of the peripheral interface in the stage 2 memory translation table; and
means for adding the mapping of the intermediate physical address of the peripheral interface to the physical address of the peripheral interface in the stage 2 memory translation table in response to receiving the request to map.

22. The computing device of claim 21, further comprising:
means for determining whether a state of the peripheral interface is locked,
wherein means for adding the mapping of the intermediate physical address of the peripheral interface to the physical address of the peripheral interface in the stage 2 memory translation table comprises means for adding the mapping of the intermediate physical address of the peripheral interface to the physical address of the peripheral interface in the stage 2 memory translation table in response to determining that the state of the peripheral interface is locked; and
means for setting the state of the peripheral interface to unlocked in response to determining that the state of the peripheral interface is locked.

23. The computing device of claim 18, further comprising:
means for signaling to a high level operating system executing on a first virtual machine to shut down and unload a peripheral device driver of the peripheral device; and
means for executing a limited high level operating system on a second virtual machine excluding the peripheral device driver of the peripheral device.

24. The computing device of claim 18, further comprising means for receiving, from a trusted execution environment that is different from an execution environment in which a high level operating system is executing, a request to unmap or to map the intermediate physical address of the peripheral interface to the physical address of the peripheral interface in the stage 2 memory translation table.

25. The computing device of claim 18, further comprising means for accessing a peripheral device driver of the peripheral device executing in a trusted execution environment by a high level operating system executing in an execution environment via routing an access request to the peripheral device driver through the trusted execution environment.

26. A non-transitory processor-readable storage medium having stored thereon processor-executable instructions configured to cause a processor of a computing device, configured for control via secure peripheral interface disablement, to perform operations comprising:
receiving a wireless signal from a computing device management software configured to wirelessly signal to the computing device in response to the computing device being located in a proximity of the location,
wherein the wireless signal is configured to cause a trigger for disablement of a peripheral interface of a peripheral device on the computing device;
receiving the trigger to disable a peripheral interface in response to receiving the wireless signal, wherein the trigger is configured to indicate the peripheral interface to the computing device;
identifying a physical address of the peripheral interface;
removing a mapping of an intermediate physical address of the peripheral interface to the physical address of the peripheral interface from a stage 2 memory translation table in response to receiving the trigger to disable the peripheral interface;
setting a state of the peripheral interface as locked by a secure execution environment;
storing the state of the peripheral interface at a secure location of the computing device; and
enabling the peripheral interface by adding the mapping in response to detecting a lack of the wireless signal when the state of the peripheral interface is locked.

27. The non-transitory processor-readable storage medium of claim 26, wherein:
the stored processor-executable instructions are configured to cause the processor of the computing device to perform operations further comprising receiving a request to unmap the intermediate physical address of the peripheral interface and the physical address of the peripheral interface in the stage 2 memory translation table; and
the stored processor-executable instructions are configured to cause the processor of the computing device to perform operations such that removing the mapping of the intermediate physical address of the peripheral interface to the physical address of the peripheral interface from the stage 2 memory translation table in response to receiving the trigger to disable the peripheral interface comprises removing the mapping of the intermediate physical address of the peripheral interface to the physical address of the peripheral interface from the stage 2 memory translation table in response to receiving the trigger to disable the peripheral interface and receiving the request to unmap.

28. The non-transitory processor-readable storage medium of claim 26, wherein the stored processor-executable instructions are configured to cause the processor of the computing device to perform operations further comprising:
receiving a request to access the peripheral interface;
checking the stage 2 memory translation table for the mapping of the intermediate physical address of the peripheral interface to the physical address of the peripheral interface;
determining that the mapping of the intermediate physical address of the peripheral interface to the physical address of the peripheral interface is not found in the stage 2 memory translation table; and
issuing a memory exception in response to determining that the mapping of the intermediate physical address of the peripheral interface to the physical address of the peripheral interface is not found in the stage 2 memory translation table.

29. The non-transitory processor-readable storage medium of claim 26, wherein the stored processor-executable instructions are configured to cause the processor of the computing device to perform operations further comprising:
receiving a trigger to enable the peripheral interface associated with the peripheral device of the computing device;
receiving a request to map the intermediate physical address of the peripheral interface and the physical address of the peripheral interface in the stage 2 memory translation table; and
adding the mapping of the intermediate physical address of the peripheral interface to the physical address of the peripheral interface in the stage 2 memory translation table in response to receiving the request to map.

30. The non-transitory processor-readable storage medium of claim 29, wherein:
the stored processor-executable instructions are configured to cause the processor of the computing device to perform operations further comprising:
determining whether a state of the peripheral interface is locked; and
setting the state of the peripheral interface to unlocked in response to determining that the state of the peripheral interface is locked; and
the stored processor-executable instructions are configured to cause the processor of the computing device to perform operations such that adding the mapping of the intermediate physical address of the peripheral interface to the physical address of the peripheral interface in the stage 2 memory translation table comprises adding the mapping of the intermediate physical address of the peripheral interface to the physical address of the peripheral interface in the stage 2 memory translation table in response to determining that the state of the peripheral interface is locked.

* * * * *